June 18, 1957  G. C. TOOTILL ET AL  2,796,218
ELECTRONIC COMPUTING DEVICES WITH SUBSIDIARY STORAGE
Filed June 21, 1950  25 Sheets-Sheet 1

INVENTORS
F. C. Williams, T. Kilburn,
G. C. Tootill, G. E. Thomas, &
D. B. G. Edwards By Moore and Hall
Attorneys

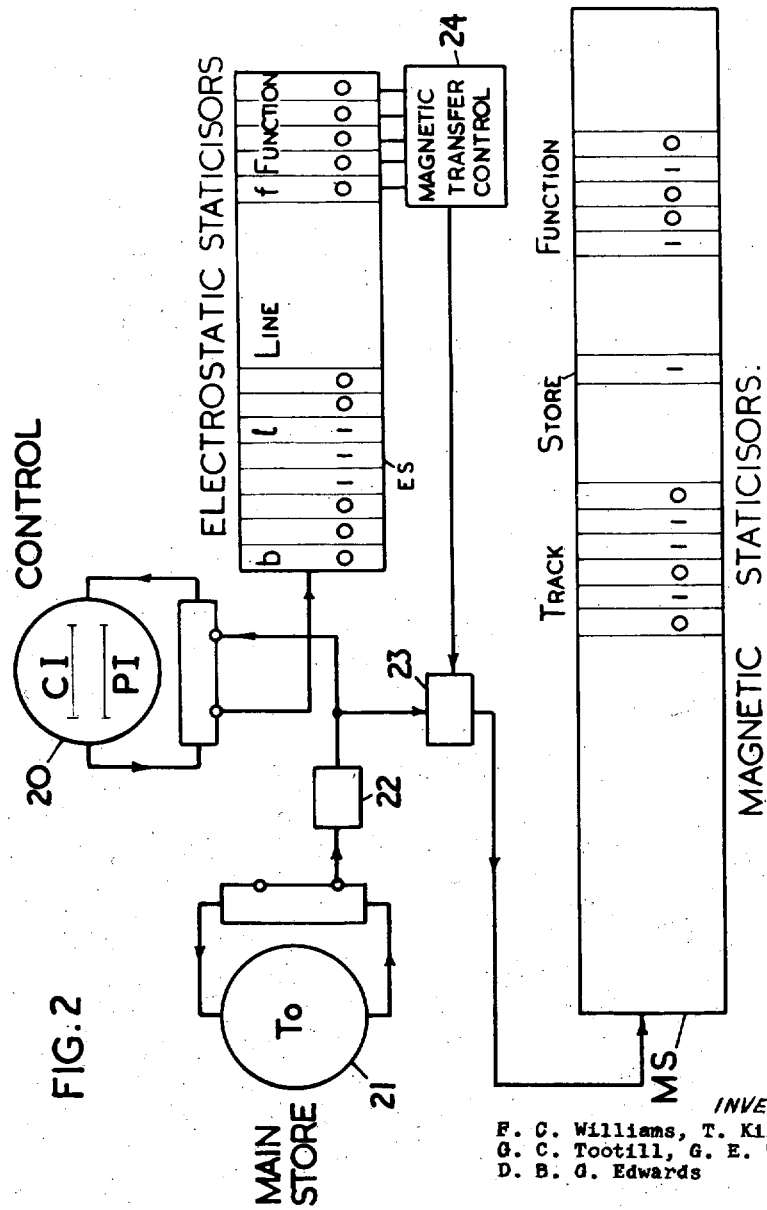

INVENTORS
F. C. Williams, T. Kilburn
G. C. Tootill, G. E. Thomas
& D. B. G. Edwards June 18, 1957

G. C. TOOTILL ET AL 2,796,218

ELECTRONIC COMPUTING DEVICES WITH SUBSIDIARY STORAGE

Filed June 21, 1950

F. C. Williams, T. Kilburn, G. C. Tootill,
G. E. Thomas, and D. B. G. Edwards

INVENTORS

By Moreand Hall
Attorneys

INVENTORS
F. C. Williams, T. Kilburn
G. C. Tootill, G. E. Thomas &
D. B. G. Edwards

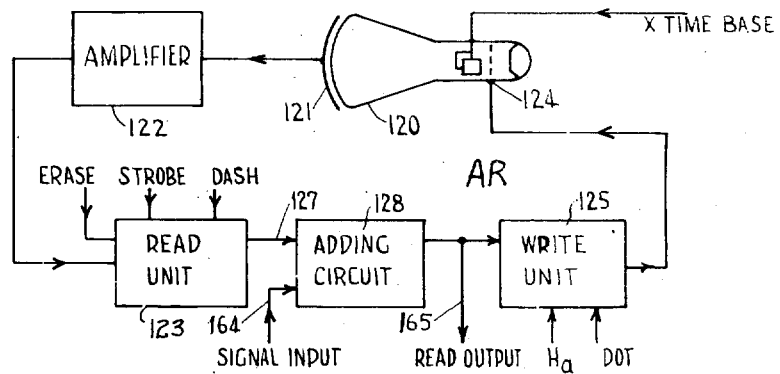
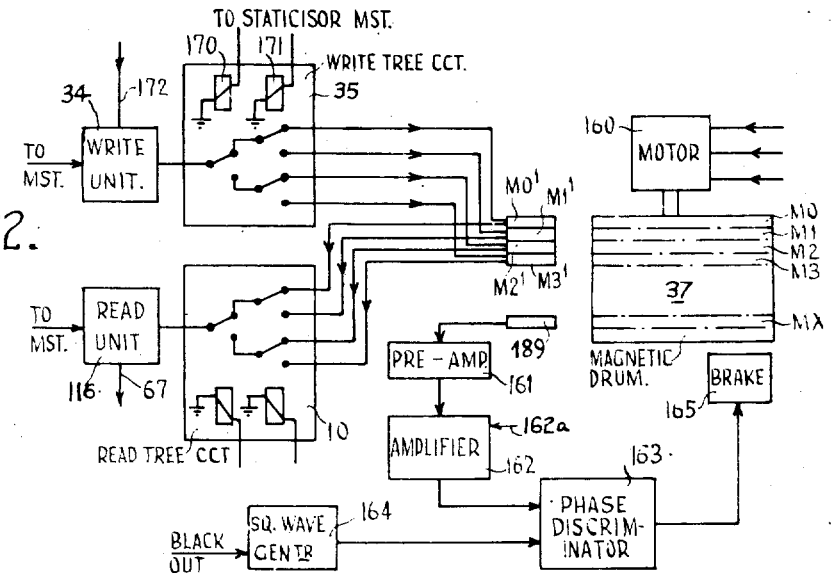
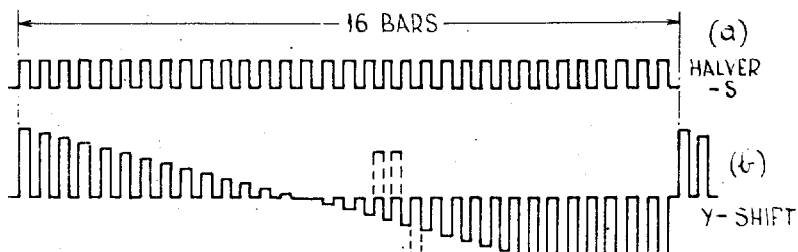
INVENTORS
GEOFFREY C. TOOTILL, FREDERIC C. WILLIAMS,
TOM KILBURN, GORDON E. THOMAS & DAVID B. G. EDWARDS
BY Stevens, Davis, Miller & Mosher
ATTORNEYS

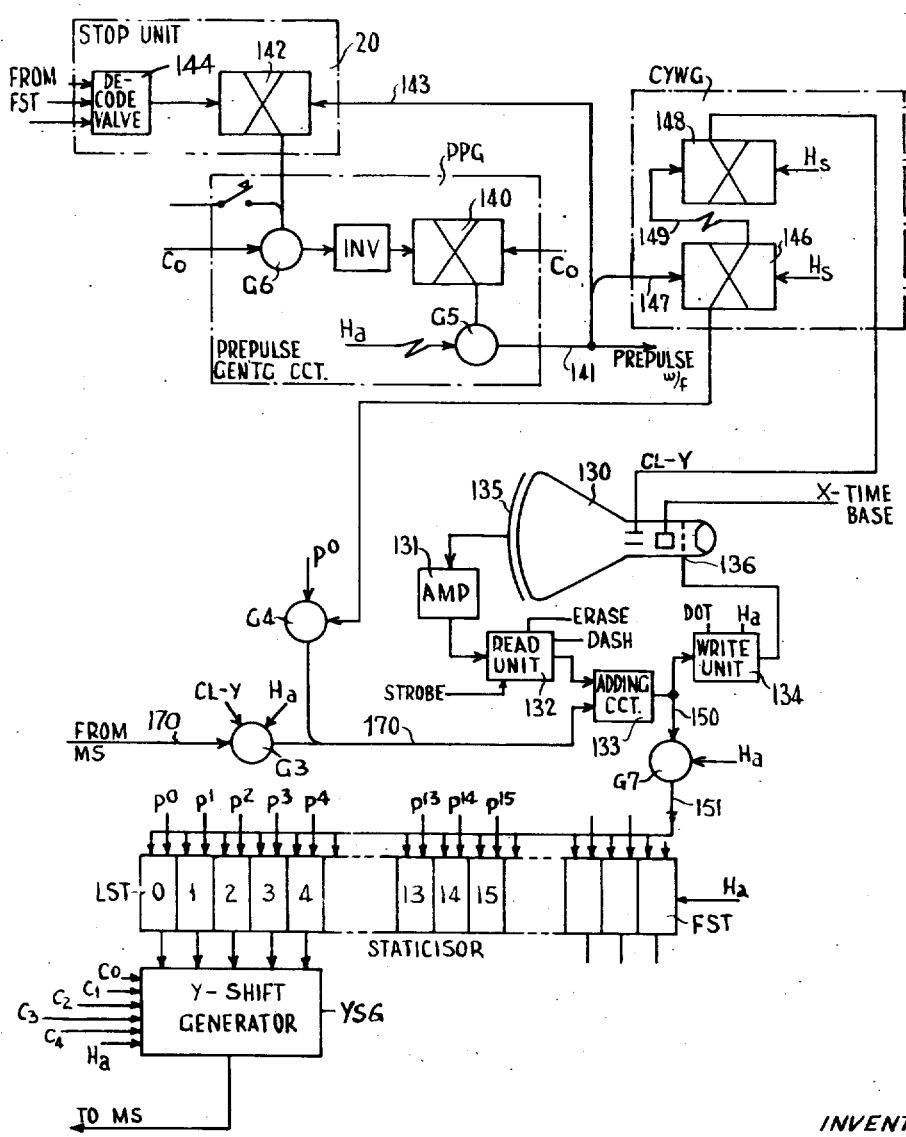

INVENTORS
F. C. Williams, T. Kilburn
G. C. Tootill, G. E. Thomas &
D. B. G. Edwards By Moore and Hall
Attorneys 2,796,218
Patented June 18, 1957

2,796,218
ELECTRONIC COMPUTING DEVICES WITH SUBSIDIARY STORAGE

Geoffrey C. Tootill, Shrivenham, Frederic Calland Williams, Timperley, and Tom Kilburn, Manchester, England, and Gordon Eric Thomas, Port Talbot, and David Beverley George Edwards, Tonteg, near Pontypridd, Wales, assignors to National Research Development Corporation, London, England, a corporation of Great Britain Application June 21, 1950, Serial No. 169,387

Claims priority, application Great Britain June 22, 1949

23 Claims. (Cl. 235—61)

The present invention relates to electronic digital computing machines and in particular to such machines in which it is necessary to store a large number of separate words, each containing many digits and representing a number or an instruction which controls the transfer of a number from one part of the machine to another. These words will be stored in digital storage devices which, in an ideal machine, would be a single type of store in which all words would be immediately accessible when required. An example of such a store is the Williams' storage tube described in a paper by F. C. Williams and T. Kilburn in the Proceedings of the Institution of Electrical Engineers, part III, March 1949.

A machine embodying a store of this type is described in a paper by F. C. Williams, T. Kilburn and G. C. Tootill in the Proceedings of the Institution of Electrical Engineers, part II, February 1951, p. 13, including arrangements in which the digital data is stored in a large number of cathode ray tubes.

Stores in which words are immediately accessible will be hereinafter referred to as high speed stores.

Unfortunately the use of a large capacity high speed store entails also the use of comparatively long instruction words to contain the address from or to which a word has to be transferred.

According to the present invention therefore there is provided an electronic digital computing machine having a high speed store and a subsidiary store with means for transferring blocks of data between the said high speed store and the said subsidiary store.

The said high speed store may comprise for example, a number of Williams' storage tubes. These stores will be used in the normal operation of the machine, by which we mean, of course, the operation in which computations are effected by the transfer of numbers between the high speed store and the computing organ of the machine.

Known high speed stores are comparatively expensive to produce and exhibit a level of reliability which calls for careful maintenance if they are to be used in large numbers.

From the engineering standpoint, therefore, it is desirable to replace as much as possible of the rapid access store by an alternative type of storage (assuming it to be available), having reduced cost per word stored and greater reliability, even at the cost of slower access.

According to the feature of the invention, therefore, the normal working store in a digital computing machine comprises a comparatively small number of high speed stores and the subsidiary store may comprise a comparatively large number of stores having a slower excess speed, for example, magnetic stores. When this is done it will be necessary to arrange for the high speed store to be refilled periodically from the slower access or "sudsidiary" store so as to ensure that the instructions and data required in the immediate future are nearly always present in the high speed store and so that only on a small percentage of occasions is it necessary to wait before obeying an instruction for the provision of new data from the slower access subsidiary store.

The use of two types of storage devices is a departure from the ideal machine especially so far as the programmer (the mathematician who sets up the machine to perform a required computation) is concerned. He will have to take more care in the arrangement of his instructions and data to ensure that the total time in solving a problem does not contain a major component that can be directly ascribed to the references that have to be made to the subsidiary store. This limitation imposed on the programmer should not be too burdensome and will be compensated for by an increase in the reliability and a reduction in the cost of the machine as a whole.

The operation of a computer employing electrostatic stores can be divided into what have been called beats, each of which corresponds with the carrying out of a single transfer of some kind. Either two or four of these beats can make up a single elementary operation or bar, for example, the machine developed by F. C. Williams et al. and described hereinafter is a 4-beat machine.

If high-speed storage of $n$ instructions and $n$ pieces of data is provided, a minimum of $n$ bars will be involved in consuming all the instructions and all the data, subject to the gross over-simplifying assumption that each instruction relates to one piece of data, and that all the instructions are obeyed in turn. Provided $n$ is sufficiently large, a great many of the $n$ instructions will be used several or even many times in an iterative loop before the computation is finished. Furthermore, certain of the operations will not be complete in a single bar, multiplication, for instance, may require of the order of five or more bars. The "life" of or number of operation bars required to work through a single filling of the high speed store will, therefore, probably exceed $n$ bars by a factor of several times, although it will probably be necessary to provide more space for data than is provided for instructions, since the "usage factor" for data is probably less than for instructions.

If the time of solution of a given problem is not to be appreciably increased by splitting the storage system into two types, it is necessary that the refilling process and the associated emptying of the high-speed store into the subsidiary store should not occupy a time period which is more than a fraction of the average life of one filling. From this it follows that the more rapid the transfer between high speed and subsidiary stores can be made, the smaller will be the necessary amount of high speed storage.

The abovementioned difficulty arising from the use of a high capacity subsidiary store and a relatively low capacity high speed store will become apparent when the present invention is more particularly described with reference to an actual computing machine. In the machine to be more particularly described hereinafter, normal instruction words for controlling the transfer of numbers from the high speed store through the computing organ contain only twenty digits but when it becomes necessary to transfer blocks of data from the high speed store to the subsidiary store, instruction words of twenty digits are insufficient, mainly because of the comparatively large number of addresses in the subsidiary store.

It is an object of the invention to overcome this difficulty and according to a feature of the invention the method of transferring data from the high speed store to the subsidiary store comprises the steps of conditioning the machine in accordance with an instruction word of normal length to accept the next following instruction as an instruction to organise the transfer and this next following instruction will be an instruction word of greater length than those used in the normal operation of the machine.

For example, in the machine to be particularly described the normal instructions are twenty digits long and this is the length of what may be called a "pre-transfer" instruction word. The next following instruction word which organises the transfer will be forty digits long. In the machine to be described the pre-transfer instruction will contain a number defining the address of the next following transfer instruction and also five function digits which will inhibit the normal operation of the machine and allow the transfer from the high-speed store to the subsidiary store to be set up and timed by the following transfer instruction word. The method of effecting a transfer according to the present invention may be more easily carried into effect by the use of a control system separate from the control system governing transfers in the normal computing operation of the machine. This separate control system will set up staticisers to route the transfer in accordance with the transfer instruction word and will also provide the necessary timing voltages for timing the transfer.

One aspect of the invention comprises a digital computing machine having this separate control system for organising transfer between the high-speed store and the subsidiary store. The preferred form of subsidiary store is a rotating magnetic drum type store as described hereinafter and closely resembling in principle that described in Technical Monograph No. 4801 entitled "Selective Alteration of Digital Data in a Magnetic Drum Computer Memory," May 1, 1948, by Engineering Research Associates Inc., and also that described in U. S. A. Patent No. 2,540,654 by Cohen et al., filed March 25, 1949.

The method of transferring information from the high speed store to the subsidiary store and vice versa embodies important features of the invention.

There are many ways in which such a transfer may be effected but the major design requirement that has to be met is that of retaining the identity of a given digit during the transfer. One way of achieving this result is to record in the subsidiary magnetic store not only the particular digit, but also, possibly on a parallel channel, an identifying number which can then be used to place the digit appropriately in the high speed electrostatic store. Alternatively, a counter may be operated from the magnetic store, which counts the emergence of digits therefrom and so provides an identity number without the need of a second parallel recording. The third and preferred method is to rely in the main on coincidence of timing between digits in the magnetic store and digits in the electrostatic store as being adequate definition of identity. This last method clearly provides the quickest possible refilling of the electrostatic store since it involves supplying digits to that store from the magnetic store at the limiting acceptance rate set by the rate of sweep of the single beam of the cathode ray tube over the numerous digit positions set out on each tube face. In any system which is not running synchronised in this way it would be necessary to provide some form of intermediate storage of the magnetic digits as they became available and then organise their subsequent delivery into the electrostatic store. Such a process would necessarily take longer and unless special arrangements were made might well take very much longer. Additional apparats would also be needed.

Identification by timing can, of course, only be applied to the digits within a block of size equal to the capacity of a single storage tube and if many fillings of that storage tube are to be held in the magnetic store, then so far as timing identity is concerned there will be many digits in the magnetic store corresponding with the single digit poistion in the electrostatic store. A subsidiary identification of the blocks in the magnetic store is therefore necessary, and again the question of access time must be borne in mind. In our invention this second block identification is provided by arranging for parallel access to all the blocks in the magnetic store via controlled channels, each channel having its own identity code. With this arrangement any block can be transferred to the electrostatic store simply by opening the channel of communication between that block and the store for the duration of one block of digits, identity within the block being preserved by the above described synchronous running feature. In this way a complete refilling (or emptying) of the electrostatic store can take place in the minimum time, namely the time taken by the electrostatic store to scan one block of digits.

It may be that a complete block is not in every case the ideal unit of data to be transferred. If it should prove necessary to transfer, say, a half or quarter of a block, or even a line, then, in the simplest case, the appropriate channel of communication would be opened for the complete block period, but the output of the magnetic store would be gated by a voltage waveform for the appropriate time period.

In a similar manner, the equipment necessary to select any block from a large number of blocks, can be greatly simplified by first selecting a group of, say, $n$ blocks arranged serially along a track, and then selecting the appropriate one out of the $n$ by the use of voltages having synchronous waveforms controlling a gating system. This method of series/parallel selection increases the time necessary to transfer any block, and the economy in selective equipment must be balanced against the resultant increase in electronic storage which may be necessary.

The synchronous or coincidence feature of the arrangement is provided by using as a magnetic store a suitable surface carried on the rim of a wheel that is constrained by servo action to rotate in exact synchronism with the sweep of a complete raster in the electrostatic store, for example in the manner described in greater detail later and essentially consisting of the use of a separate track on the drum containing pulse signals whose physical position is related to the storage locations in the other tracks and from which are derived timing signals which are compared as to their phase relationship with a suitable recurrent waveform associated with the operating rhythm of the computing machine and from which a variable brake controlling current is derived to operate an electromagnetic brake associated with the rotating drum so as continuously to adjust the speed and instantaneous angular position of the drum so that every position of the cathode ray tube beam corresponds with a single position of the wheel. The digits of a given filling are then arranged around a narrow track on the periphery of the wheel by reading and writing heads of normal design. Alternative fillings are accommodated on adjacent tracks using separate heads. The tracks are selected by interposing electronic or electrical switches between the heads and the reading and writing amplifiers.

It may be remarked that whereas a single cathode ray tube will store of the order of 2,500 digits, a single wheel will store something of the order of 100,000 or 200,000 digits. Although the cost of the wheel and its associated heads and amplifiers doubtless exceeds that of a cathode ray tube and its associated circuits, the factor is nowhere near 50 and in any case the magnetic store is more robust, more reliable and does not depend on the maintenance of power supplies for the continuance of storage.

In order that the invention may be more clearly understood, a digital computing machine comprising a high-speed electrostatic store of the Williams' type and a magnetic subsidiary store will now be described with reference to the accompanying drawings in which:

Figure 1 shows a block diagram of a computer,

Figure 2 shows in a schematic form a method of controlling the magnetic store in a computer, Figures 3 and 4 show transferring information from the electrostatic to the magnetic store, Figure 5 shows voltage waveforms occurring at various parts of the apparatus shown in Figure 3, Figures 6 and 7 show apparatus for selecting a particular cathode ray tube store, Figure 8 shows voltage waveforms occurring at various parts of the apparatus shown in Figure 7, Figure 9 shows wave-forms illustrating the operation of a cathode ray tube store, Figure 10 shows waveforms illustrating the operation of the magnetic transfer apparatus, Figure 11 shows in a schematic form the apparatus involved in transferring information from the magnetic to the electrostatic store, Figures 12, 14, 14 (con.), 16, 16 (con.) and 29 to 34 show circuit details of various parts of the apparatus shown in Figures 3, 4 and 11, while Figures 13, 15 and 17 show voltage waveforms occurring at various parts of the circuits shown in Figures 12, 14 and 16 respectively.

Figure 20 is a diagram showing the general arrangement of an accumulator device embodying a cathode ray storage tube.

Figure 21 is a diagram showing the general arrangement of the control system of the machine of Fig. 18 and also embodying a cathode ray storage tube.

Figure 22 is a diagram showing the general arrangement of a magnetic drum type subsidiary data item store with its speed and position controlling means.

Figures 24, 25, 26 and 27 show various electrical waveforms concerned with the operation of such a machine.

In order to make the present invention more readily understandable the form of the aforementioned existing Williams' machine will first be briefly described with reference to Figures 18–28.

Figure 18:
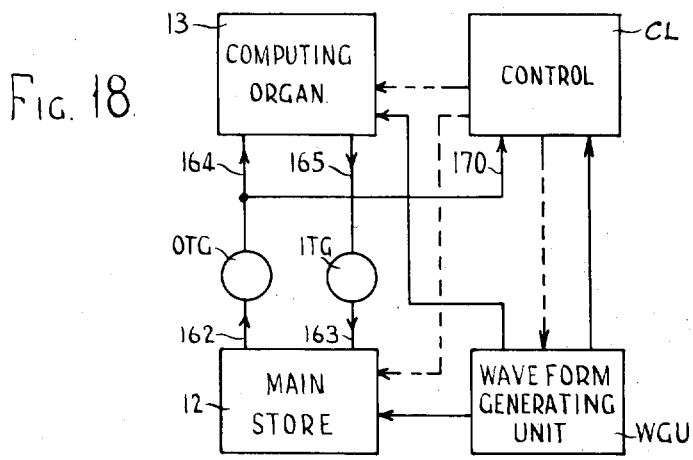
Figure 18 is a block schematic diagram showing the general arrangement of the aforementioned existing Williams' machine.
Figure 25:
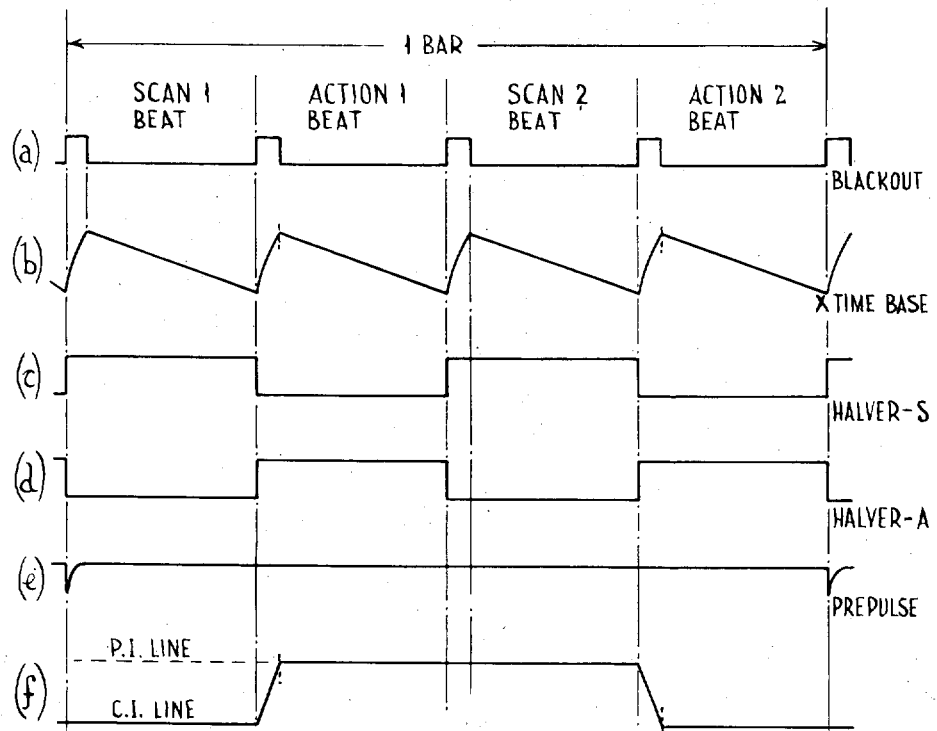

Referring first to the block schematic diagram of Figure 18 of the machine illustrated comprises a main data store 12 consisting of a number of separate storage tubes of the cathode ray tube type each with their ancillary parts as described in greater detail later with reference to Figure 19. Each tube includes a read output lead upon which a pulse signal train representing either a binary number or an instruction may be derived from any selected address in the store and a write input lead upon which a similar pulse signal train may be supplied to write a number or instruction signal into any selected address in such store.

The respective individual read output leads from different tubes in the store are combined in a non-mutually reactive manner to supply a main read output lead 162 which includes an outward transfer gate OTG while the respective individual write input leads for each of the tubes are similarly combined to be supplied from the main write input lead 163 which includes an inward transfer gate ITG.

The actual arithmetical operation required, such as addition or subtraction, multiplication or division, is performed in an arithmetical organ or accumulator 13 which also includes a cathode ray storage tube and operates with the number-representing pulse signal trains available on lead 162. One example of accumulator device will be described in greater detail later with reference to Figure 20 of the drawings. Such accumulator has an input lead 164 connected to the gate OTG and through which numbers, represented by pulse signal trains, may be fed from the main store 12 to the accumulator 13 for addition to (or subtraction or other arithmetical combination with) the existing content of such accumulator. The existing number content of the accumulator is available on output lead 165 which is connected to the gate ITG whereby such numbers may be fed back to the main store 12 when desired.

The gate circuits OTG, ITG are conveniently of the known multiple diode type their controlling potentials, which determine whether they are open to transmit signals therethrough or closed to inhibit such transmission, being provided from a control system CL. This control system, of which an example will be described in greater detail later with reference to Fig. 21 is arranged to be supplied with instruction signals from the main storage means 12 by way of lead 170 and governs the step-by-step operation, at the controlling rhythm of the machine, in the carrying-out of the various sequential orders or instructions which constitute the prepared programme of instructions devised by the opreator of the machine. This control system includes means which govern the selection, during each operative cycle or bar covering one of the aforesaid instructions, of an appropriate instruction word from its known storage location in the main storage means 12 and the subsequent use, in the same bar, of such selected instruction word to control the various gate and other like circuits which determine the particular signal transfer channels and other parts of the device which are to be operative at that time for the carrying out the desired computation step and also the selection of the particular storage location in the main storage means 12 of the number word involved in the computation step. The control system also includes two staticisor devices to be described later each consisting of a plurality of separate sections, one for each digit of an instruction word and by which, a static or maintained electric potential representative of the related digit in the transient pulse signal train, is provided. Suitable combinations of these staticised digit signals are used to control the various elements like the gate circuits OTG, ITG . . . , and other parts of the machine.

The machine operates in the serial mode to a predetermined timing rhythm which is determined fundamentally, in the usual manner, by a master or so-called clock oscillator. The operating rhythm is controlled by a series of electric waveforms provided by a waveform generator unit WGU whose nature and function will next be considered in greater detail with reference to Fig. 23.

The rhythm of the machine comprises a succession of major cycles or bars, one for each computation step and each subdivided into a number of equal-length minor cycles or beats whose individual time duration is sufficient for the expression, as a serial pulse signal train, of one basic length number or instruction word of 40 digits. These minor cycles or beats are used some (Scan beats) for effecting regular regeneration of the information stored in the various cathode ray tube storage devices and others (Action beats) for reading out, writing in and using the signals representing such stored words. In the normal machine operating rhythm there are four beats in each bar, the first and third being Scan beats S1 and S2, and the second and fourth being Action beats A1 and A2, but during transfer operations the bar length is extended to cover the time period necessary to complete the required transfer, one word being transferred during each beat.

Figure 23:
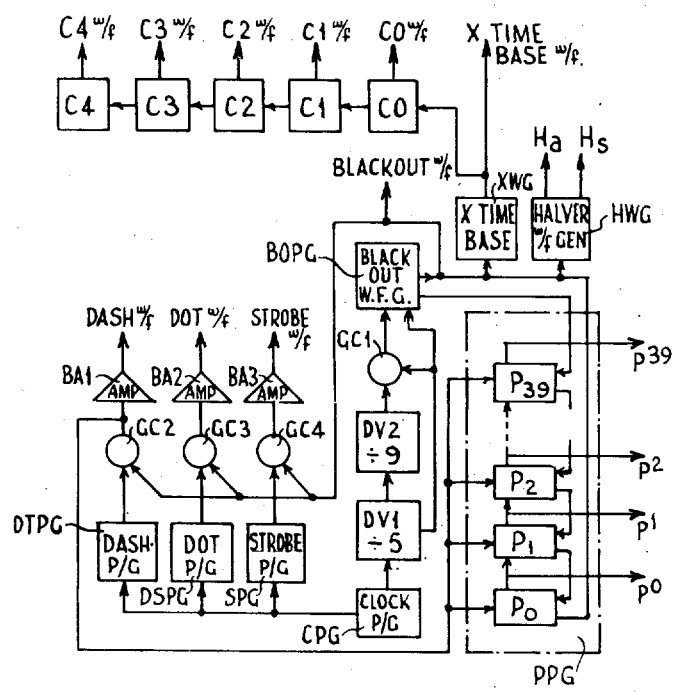
Figure 23 is a mainly schematic diagram showing the principal rhythm controlling waveform generating means for the machine of Fig. 18.
Figure 27:
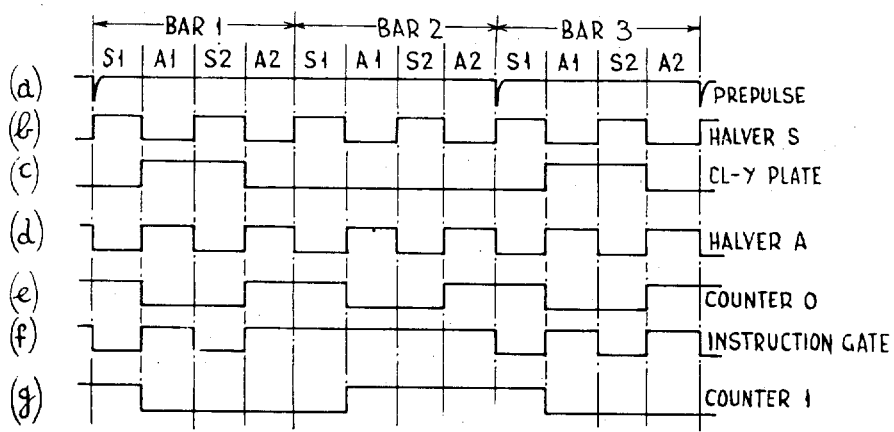
Figure 24:
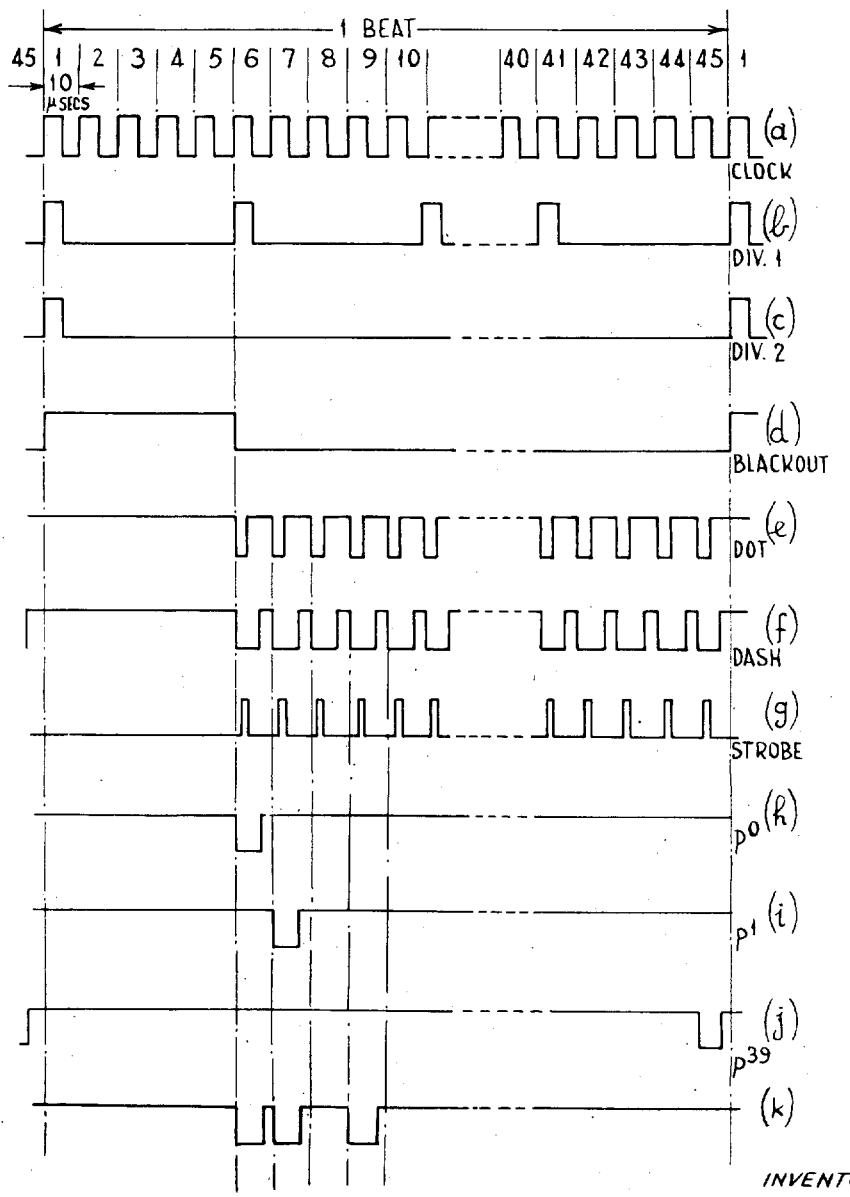
Figure 28:
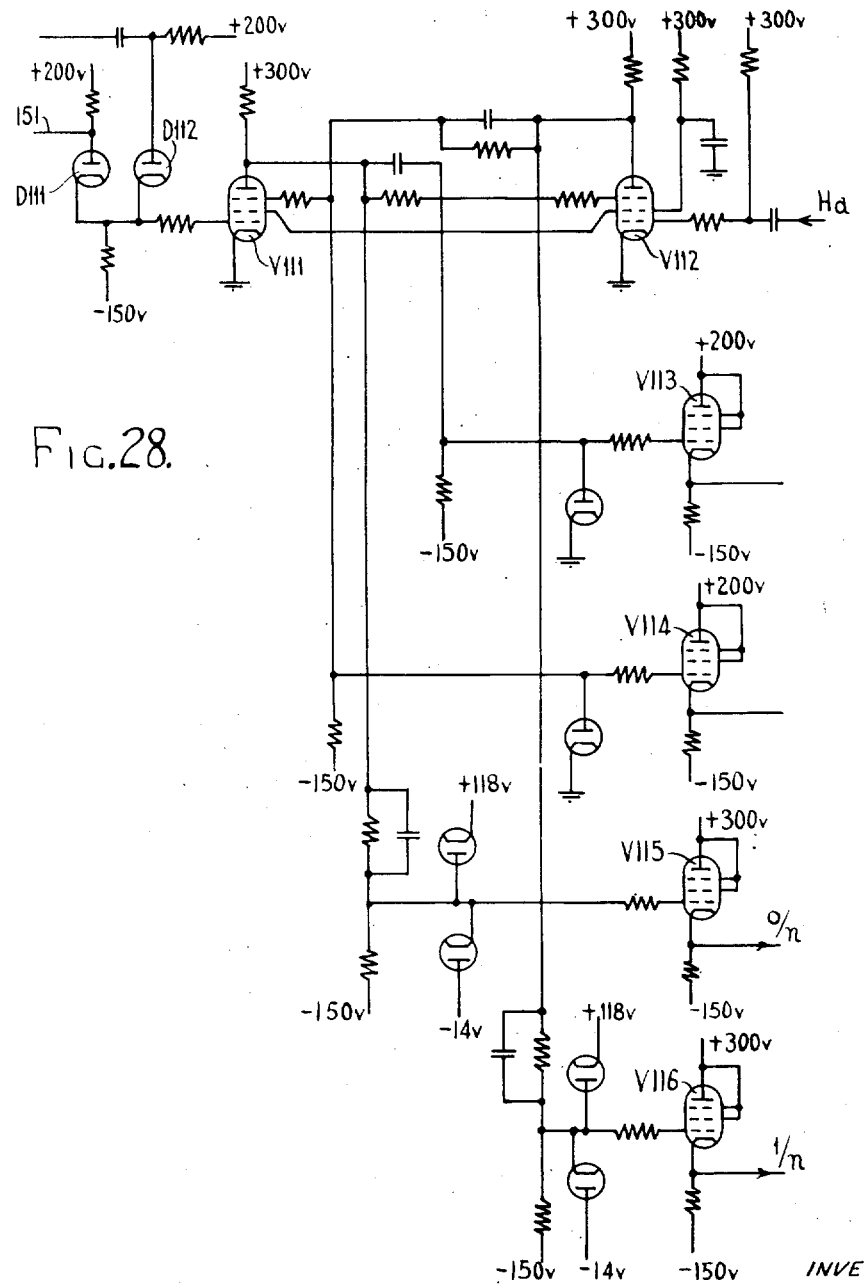
Figure 28 is a circuit diagram of a typical staticisor section.

Referring now to Fig. 23 the master or clock pulse generator CPG comprises a stable oscillator and pulse squaring means which provides a series of square sided Clock pulses whose period time is 10 microseconds as shown in Fig. 24(a). This period time is that allocated to the expression of a single digit of a number and is known as the digit interval time or period. These pulses are applied to a divider circuit DV1 which provides a squared output pulse for every five input pulses as shown in Fig. 24(b) and the output from this circuit is applied to a second divider circuit DV2 providing a squared output pulse for every nine input pulses as shown in Fig. 24(c). These divider circuits may be of any suitable form, for instance, circuits of the well known "Phantastron" type. The output pulses from the divider circuit DV2, occur one for every 45 Clock pulses and hence serve to mark each minor cycle or beat period.

The output pulses from divider circuit DV1 are applied as one triggering input to a two-stable-state trigger or flip-flop circuit BOPG whose other or resetting input is supplied from the divider circuit DV2 by way of a gate circuit CC1 which is opened by the supply thereto of pulses from the divider circuit DV1. The resultant output from circuit BOPG is shown in Fig. 24(d) and also, in a reduced time scale in Fig. 24(a) as a positive-going pulse during the period of Clock pulses 1 to 5 of each beat and negative-going for the remaining period of each beat. This waveform, which is applied to the tube cathodes, is used primarily to suppress the beams of the cathode ray tube stores during the flyback time between each scanning movement of such beams and is hence known as the Blackout waveform.

The requisite repetitive scanning motion of the cathode ray tube beams of the storage devices is provided by an X time base generator circuit XWG which is of any conventional triggered type and serves to deliver a repetitive sawtooth waveform as shown in Fig. 25(b) so that the flyback portions coincide with the positive-going portions of the Blackout waveform and the linear scanning or rundown portions with the negative-going portions of that waveform.

As explained in the aforesaid paper by Williams and Kilburn, the operation of the cathode ray tube storage device requires the provision of Dot, Dash and Strobe waveforms during each digit interval of the 40-digit period allocated in each beat to the word signal and these waveforms are provided by the pulse generator circuits DTPG, DSPG and SPG respectively which supply waveforms as shown in Fig. 24(e), Fig. 24(f) and Fig. 24(g). These circuits may be of any convenient form, such as flip-flop circuits, and they are each triggered by the Clock pulses. Elimination of those pulses of each waveform which occurs during the tube blackout periods is effected by supplying the output from each generator circuit through a gate circuit GC2, GC3, GC4 which is controlled by the Blackout waveform. Each waveform is then fed to a buffer amplifier BA1, BA2, BA3 whose output constitutes the source of supply of such waveform throughout the machine. Although not shown, use is frequently made in the machine of reverse polarity versions of every waveform, these being obtained in conventional manner by means of a phase inverter valve or the like.

Also as explained in the aforesaid paper by Williams and Kilburn, the alternate Scan/Action rhythm and the systematic regeneration of all of the storage lines in such cathode ray tube stores, calls for the provision of so-called Halver and Counter waveforms. The Halver–S waveform of Fig. 25(c) and its antiphase counterpart, the Halver–A waveform of Fig. 25(d) are generated in a trigger circuit HWG which is reversed by each positive-going edge of the Blackout waveform (Fig. 25(a)). The Counter 0 waveform which has twice the period time of the Halver waveform as shown in Fig. 27(e) is generated in the first of a chain of binary counter stage C0. C1, C2, C3 and C4 which are serially triggered one from another in the conventional manner. The remaining counter waveforms, C1, C2, C3 and C4, each progressively of doubled period time are derived from the succeeding stages of the counter chain.

The signals representing both number and instruction words within the machine are of the general form of which Fig. 24(k) is a typical example. In each digit interval or period of 10 microseconds, the presence of a negative-going square pulse during the first 6 microseconds (a replica of a Dash pulse) signifies the binary digit value "1" whereas the absence of such a pulse signifies the binary digit value "0." The digits are signalled in ascending power order, the first digit in Clock pulse period 6 of each beat being representative of binary denomination $2^0$, the second in Clock pulse period 7 the binary denomination $2^1$ and so on. Thus the number signal of Fig. 24(k) represents $1.2^0+1.2^1+0.2^2+1.2^3+0$ ... or 11.

For effecting selective examination of each individual digit period in turn and for other purposes there is provided a group of 40 single pulse waveforms, each on separate leads and each consisting of a single Dash pulse during each beat coincident with one only of the digit periods. These waveforms are known as p-Pulses and Fig. 24(h) shows the first of the group comprising a pulse in the first or $2^0$ digit period of each beat. This waveform is referred to as the p0-Pulse. Fig. 24(i) shows the second of the group or the p1-Pulse while Fig. 24(j) shows the last of the group or the p39-Pulse.

These p-Pulse waveforms are generated in the unit PPG of Fig. 23 which comprises a series of triggered gate circuits $p^0, p^1, p^2 \ldots p^{39}$ all of which are supplied with the Dash waveform. Normally each circuit is in inoperative condition and produces no output but each can be conditioned for operation by the application of a positive transient voltage in readiness to provide an output pulse coincident with the arrival thereat of the next following Dash pulse. The first circuit $p^0$ is conditioned by the application thereto of the Blackout waveform while the subsequent circuits $p^1 \ldots p^{39}$ are each conditioned by the output pulse from the preceding circuit. The circuits $p^0 \ldots p^{38}$ are reset back to their inoperative state by potentials due to the conditioning of the next subsequent circuit while the last circuit $p^{39}$ is reset by the leading edge of the next Blackout pulse. Each circuit is therefore operative in turn for one digit interval only.

Figure 19:
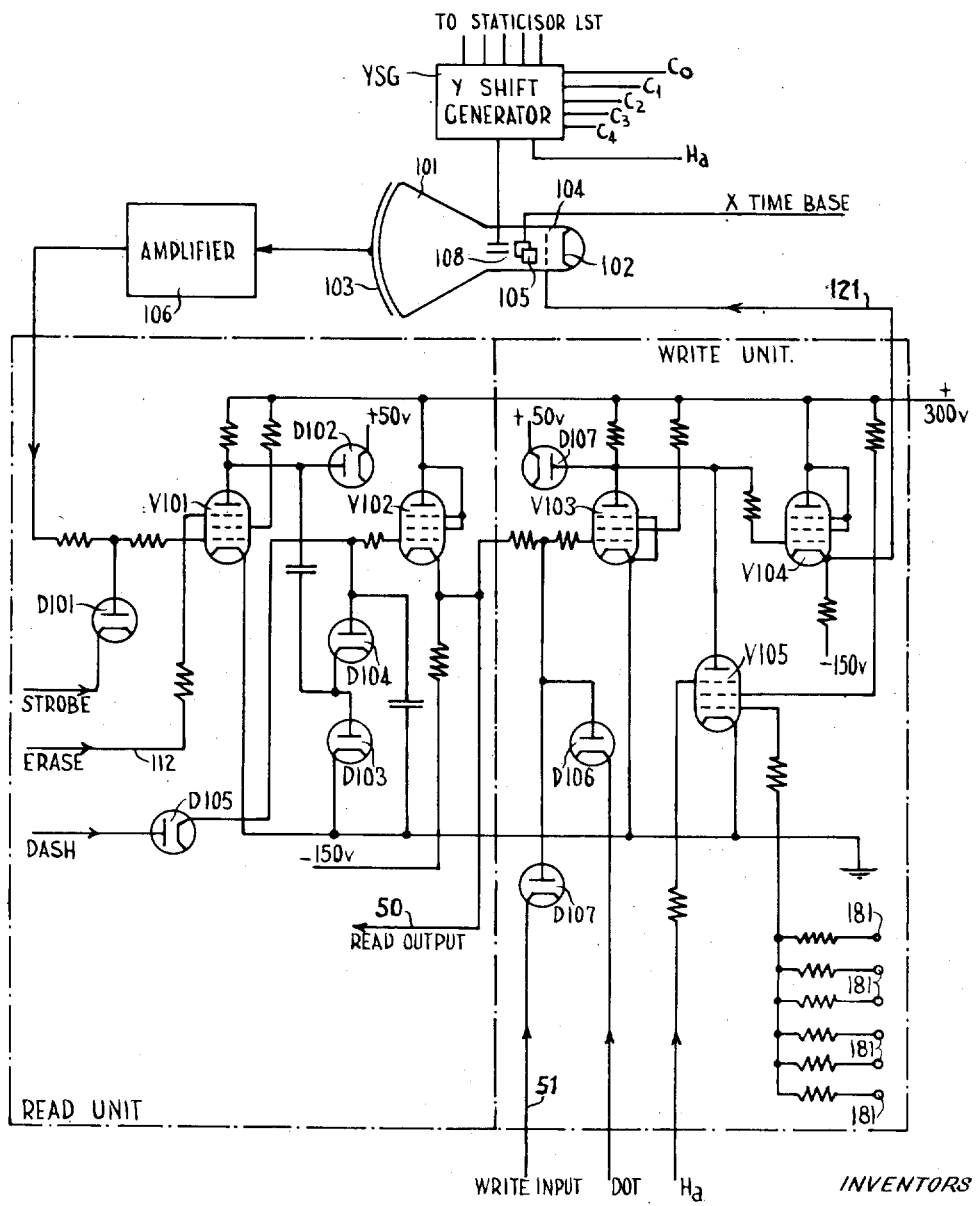
Figure 19 is a diagram showing the general arrangement of a cathode ray storage tube and its ancillary parts.

Fig. 19 illustrates the general form of one of the cathode ray storage tubes of the main storage device 12. The device comprises an electrostatic cathode ray tube 101 having the usual electrodes including a cathode 102, a modulating grid 104 and X and Y deflection plates, 105 and 108. A signal pick-up plate 103 is located closely adjacent the tube screen and provides output signals representative of the various charge patterns formed on such screen as the tube beam sweeps thereover. These signals are applied to an amplifier 106 and thence to a valve V101 which is normally held cut off but which may be turned on, once during each digit period by the pulses of the Strobe waveform fed thereto through diode D101. The charge pattern on the screen of the tube which represents the binary value "0" provides a negative-going transient pulse at the output of amplifier 106 whereas the charge pattern representative of binery value "1" provides a positive-going transient at such amplifier output. In consequence, the valve V101, is turned on by the Strobe pulse only when a "1" digit signal is received thereat. The anode output from valve V101 is fed by way of a network including clamping diodes D102, D103 and D104 to cathode follower valve V102 which is also supplied with the Dash waveform (Fig. 24(f)) by way of diode D105 and provides a reshaped, i. e. Dash pulse on the read output lead 50 whenever a positive or "1" signal is received from the signal pick-up plate 103 but not otherwise. These components constitute what will hereinafter be called the Read unit of the storage device.

In addition to being externally available on lead 50 the output signals from valve V102 are also fed to valve V103 which operates as an amplifier which is normally fully turned on but which is repeatedly cut-off during each digit period by application of the Dot waveform (Fig. 24(e)) by way of diode D106. The anode output of this valve V103, in the form of positive-going square pulses limited at +50 v. by diode D107 is applied to a cathode follower valve V104 and the output of the latter is fed to the modulating electrode 104 of the tube 101 to modulate the tube beam. In the absence of any output from valve V102, a series of Dot pulses are used to modulate the tube beam but when a "1" signal is supplied from the amplifier 106, such Dot pulses have Dash pulses from valve V102 superimposed thereon whereby the tube beam is modulated by a Dash instead of a Dot to record "1" instead of "0" on the tube screen thereby effecting regeneration of the previous record. Instead of utilizing the signal output from valve V102, i. e. the Read output, to control valve V103, an external pulse train signal, such as that of Fig. 24(k) may be applied on the write input lead 51 through diode D107. If necessary, the signals arriving from the amplifier 106 can be suppressed, thereby erasing the previous record, by applying a negative voltage on lead 112 to valve V101. The valves V103 and V104 and their associated components constitute what will hereinafter be called the Write unit of the storage device.

During normal operation the tube beam is caused to scan each of its 32 parallel storage lines, each holding one 40-digit word in turn during 32 consecutive scan beats to effect systematic regeneration of the store contents and is also caused to scan any selected line during the intervening Action beats by the conjoint action of the X time base waveform of Fig. 25(b) applied to the X deflection plates and the Y-Shift waveform of Fig. 26(b) applied to the Y deflection plates. The latter waveform is derived from the Y-shift generator circuit YSG which is controlled, during Scan beats, by the Halver and Counter waveforms and during Action beats, by the selection of static potentials set up by the staticisor LST to be described later in response to the address selection digit configuration of an instruction word. Details regarding the form of such Y-shift generator together with further detailed information upon cathode ray tube storage devices and their principle of operation are to be found in the aforesaid paper by Williams and Kilburn.

When more than one storage tube is used in the main storage means, it is necessary to effect regeneration of all tubes during Scan beats but to suppress all but the desired single tube during the intervening Action beats. This is effected by the provision of a so-called black-out valve V105 connected between the control-grid of valve V104 and the earth line. When valve V105 is conducting, the control-grid potential and hence the cathode potential of valve V104 is lowered to an extent which causes suppression of the associated tube beam whereas when such valve V105 is cut-off, the valve V104 operates normally as already described. Valve V105 is supplied at its suppressor grid with the Halver-A waveform, Fig. 25(d) so that it and all other similar valves are cut-off during Scan beats while its control grid is connected by way of six separate parallel leak resistances to terminals 181 which in turn are connected to appropriately selected output terminals of those sections of the staticisor LST which are concerned with the digits of the instruction word governing tube selection. Each tube has its terminals 181 connected to a different selection of staticisor outputs so that only one tube of the plurality avaliable has all of its leaks connected simultaneously to a suitable negative potential. Unless all the leaks are thus supplied the valve V105 remains conducting and the associated cathode ray tube is suppressed. Thus one tube alone is operative during Action beats. The valve V105 and its associated leaks constitute a so-called "decoding valve" arrangement by which a potential change at the anode of the valve and usable for, say, gate control purposes, is made available only by one particular combination of input potentials.

Referring now to Fig. 20, the accumulator 13 comprises a single cathode ray storage tube 120 with its signal pick-up plate 121 connected by way of amplifier 122 to a read unit 123 as in the device of Fig. 19 just described. The modulating grid 124 of the tube is likewise supplied from a write unit 125 but instead of the read and write units being directly interconnected as in Fig. 19 the read output lead 127 is connected to one signal input terminal of an electric signal-operated adding circuit 128, the other input of which constitutes the external signal input 164 of Fig. 18. The output lead from the adding circuit provides the input for the write unit and also supplies the read output lead 165 of Fig. 18. The general construction of the device is as already described with reference to Fig. 19 but as, in the example given, one storage line alone is required, no Y shift is required.

In the normal operation of such a device the first applied number-representing signal is stored in the single storage line by application to the input lead 164 whereby it is applied to the adding circuit 128 in synchronism with a series of "0" signals from the hitherto empty storage line arriving by way of the amplifier 122 and read unit 123. The answer number, i. e. the input number unaltered, which is available at the output of the adding circuit is then used to control the write unit 125 whereby such input number is written into the storage line of the tube and will thereafter be continuously regenerated until further use of the accumulator takes place. Upon the arrival, in a succeeding bar, of another input number on lead 164, this will be added to the number already in the store by the action of the adding circuit 128 and the answer or sum-representing number will be applied instead to the write unit 125 for storage in the tube. Such answer number is also available as an external signal on the read output lead 165. Clearing of the content of the accumulator at any time is effected by applying a suitable erase potential to the read unit 123 as in the main sotrage device already described with reference to Fig. 19.

The arrangements of the control system CL are shown in schematic form in Fig. 21 and comprise a further cathode ray storage tube 130 arranged with a regenerative loop consisting of amplifier 131, read unit 132, adding circuit 133 and write unit 134 between its signal pick-up plate 135 and its beam modulating electrode 136. In these respects it closely resembles the tube of the accumulator but unlike the latter, it has two separate storage lines which are selected by the CL—Y-waveform of Fig. 27(c) which is generated in the waveform generator circuit CYWG to be described later. As will be seen from Fig. 27(c) the tube beam will scan one line (known as the CI line) during the first and fourth beats, S1 and A2 and the other line (known as the PI line) during the second and third beats, S2 and A1, of each bar.

The second input of the adding circuit 133 constitutes the signal input lead 170 to the device and this is connected by way of a gate circuit G3 to the read output lead 162 of the main storage means MS. The gate G3 is of the And type controlled by the Halver-A and CL—Y waveforms so as to be open only during beat A1 of each bar. The lead 170 is also supplied by way of an And gate circuit G4 with the p0-Pulse waveform. This gate circuit G4 is controlled by a voltage provided in a unit CYWG, to be described, so as to be open only during beat S1 of a bar.

The commencement of each bar of operation is marked by the generation of a sharp pulse-form starting signal, known as a Prepulse as shown in Fig. 25(e) and these signals are generated in a Prepulse generator circuit PPG which essentially comprises a two-stable state trigger circuit 140 which is triggered by the positive-going edge of the Counter 0 waveform, Fig. 27(e), at the end of each S2 beat. When in this triggered condition the trigger circuit 140 delivers a potential which opens gate circuit G5 to allow the next following negative-going edge of the Halver-A waveform to generate, through a differentiating circuit, the requisite negative Prepulse signal on lead 141. The trigger circuit 140 is reset by the next following negative-going edge of the same Counter 0 waveform to close gate circuit G5.

The application of the Counter 0 waveform to the triggering input of trigger circuit 140 is by way of an And gate circuit G6 which is normally held open by the potential delivered from a further trigger circuit 142 when in its reset state. This latter circuit is normally held in such reset condition by the continuous application thereto of the Prepulse signals by way of lead 143 but the circuit can be triggered in certain conditions when it is desired to stop computation by a triggering input derived from a decode valve 144, which resembles that of the valve V105 of Fig. 19 previously described, and operated only upon the occurrence of a certain combination of digit signals in a Stop instruction word currently operative in the machine and set up on the staticisor FST.

The unit CYWG comprises a first two-state trigger circuit 146 which is triggered by each issued Prepulse signal on lead 147 and is reset by the next negative-going edge of the Halver–S waveform, Fig. 27(b). When reversed from its triggered to its reset state, i. e. at the end of beat S1 of each bar, it causes triggering of a second trigger circuit 148 over lead 149. This second trigger circuit 148 is then reset by the next following negative-going edge of the Halver–S waveform at the end of beat S2 whereby the output from such trigger circuit 148 constitutes the requisite line shift or CL—Y waveform of Fig. 27(c). The output from trigger circuit 146 also provides the control potential for gate circuit G4 previously described so as to open the latter during beat S1 of each bar and thus allow the $p0$-Pulse, which is of numerical value $2^0$, i. e. unity, to be applied to the adding circuit 133.

The read output from the storage tube 130 of the control system store, on lead 150 is applied by way of a gate circuit G7 controlled by the Halver–A waveform to be open during beats S1 and S2 and closed during beats A1 and A2 of each bar. When open this gate circuit allows the passage of signals from the lead 150 to lead 151 feeding each of the 40 separate sections of two staticisor units LST and FST. These staticisor sections are each of the form shown in Fig. 28 and comprise essentially a two-stable state trigger circuit of valves V111 and V112 which can be triggered to turn valve V111 off only upon the simultaneous occurrence of an input "1" representing signal pulse on lead 151 supplying diode D111 and a particular one of the $p$-Pulse series applied to the diode D112. Diodes D111 and D112 thus form and And gate which selects and examines one digit period only of each applied signal. As each of the staticisor sections are supplied with a different one of the $p$-Pulse series, each examines a different digit of the applied signal and the subsequent state of each of the trigger circuits represents, in static form, the nature of the applied transient signal, the trigger circuit if triggered representing digit value "1" and if still reset, the digit value "0." All of the trigger circuits are reset in parallel by the negative-going edges of the Halver–A waveform at the ends of the A1 and A2 beats.

The setting state of the trigger circuit of each staticisor section is signalled externally by the output potentials provided by four separate cathode follower stages of V113, V114, V115 and V116. The outputs of stages V115 and V116 which need only be considered here, known as the $0/n$ and $1/n$ outputs (where $n$ indicates the number of the signal digit examined by the particular staticisor section) are antiphase versions, one of the other, the terminal $0/n$ giving a negative gate-operating potential only while the section is in its reset or "0" representing state and the $1/n$ terminal such negative gate-operating potential only when the same section is in its triggered or "1" representing state.

Reverting now to Fig. 21, the five sections 0, 1, 2, 3, 4 of staticisor LST supply potentials from their $1/n$ output to a Y-shift generator circuit YSG which is substantially equivalent to that shown in Fig. 35 of the Williams and Kilburn reference paper previously quoted except that said staticisor output potentials control gate circuits which form the equivalent of the hand switches S0, S1 . . . S5 described and shown in that publication. This Y-shift generator provides a stepped waveform for the tubes of the main storage means MS which is of the form shown in Fig. 26(b) by which each of the 32 lines on each tube is scanned and regenerated in turn during successive scan beats S1, S2, S1, S2 . . . of 16 bars while the particular line scanned during each intervening Action beat is determinated by the setting of the aforesaid 5 sections of the staticisor LST.

As will thus be seen the first five digits (known as the 1 digits) of an instruction word determine which line of a storage tube in the main storage means MS is to be operative at any one Action beat. Further digits, say those of 5–10, (known as $e$ digits) can be allocated to determining which tube out of a number of tubes in such store is to be operative by applying different combinations of the $0/n$ and $1/n$ outputs to the six input terminals of each valve V105, Fig. 19, of each storage tube. Thus tube No. 1 would be signalled by the digits 000000 in digit positions 5–10 of the instruction and would have each leak input connected to the $0/n$ terminal of the staticisor sections 5–10.

Other digits of the instruction word (known as $f$ digits) similarly operative upon the function staticisor FST, are applied to determining the particular operation which is to be performed by opening and closing different gate circuits, stimulating different units into operative state and so on. Thus the stop unit 20 of Fig. 21 is shown connected to the 1/13, 1/14 and 1/15 staticisor terminals and will be activated to stop the machine whenever the instruction word in current use has "1" digits in the $p13$, $p14$ and $p15$ positions. Other digits are similarly allocated to other special purposes.

The basic rhythm of operation of the control system shown in Fig. 21 and so far described is as follows. Upon the release of a Prepulse on lead 141, a $p0$-Pulse is immediately released through gate G4 and is added to the number already existing, known as the Current Instruction, on the C. I. storage line in tube 130. This number, thus increased by unity, is regenerated and, at the same time, is read out over lead 150 and gate G7 to the staticisors LST and FST. As this Current Instruction merely defines the address of the next required instruction, known as the Present Instruction, in the main storage means 12, all the $f$ digits effective upon the staticisor FST are "0" and the latter is unaffected. During this first, S1, beat of the bar, the tubes in the main store have all been regenerating on a line determined by the stepped operation of the Y-shift generator circuit YSG.

At the commencement of the next, A1, beat the control of the Y-shift generator circuit YSG reverts to the staticisor sections LST whereby the correct line holding the next required Instruction word is scanned (instructions are normally placed in sequential lines of one or more tubes in the required order). At the same time, the CL—Y waveform shifts the beam of tube 130 to the other or P. I. storage line so that the selected instruction number is then read out by way of leads 162, 170 and gate G3 into such P. I. line of tube 130. Gate G7 is closed during this beat so that this signal which is present on lead 150 does not effect the staticisors LST and FST.

During the next beat, S2, the beam of tube 130 continues to scan the P. I. line to regenerate the number just delivered and, as gate G3 is now closed to prevent any input from lead 170 while gate G7 is opened again, this P. I. number is fed to the staticisors LST and FST which have meanwhile been reset to zero. Such staticisors are thus now set up with the required operation controlling Present Instruction number. Meanwhile normal systematic regeneration has been going on in the tubes of the main storage means 12.

In the fourth beat, A2, scanning control of the main storage tubes in unit MS again reverts to the staticisor LST whose new setting determines which line in which tube is to be used in the ensuing beat. Similarly the setting of the various sections of the function staticisor FST determines, by their various control potential outputs, which gate circuits are to be closed or open and which units are to be operative. During such fourth beat, A2, the required operation is carried out between the determined storage addresses.

A simple form of magnetic storage device is shown in Fig. 22. Such device closely resembles that described by A. A. Cohen et al. in Technical Monograph No. 4801 by Engineering Research Associates Inc., May 1, 1948, and comprises a cylindrical drum 37 of non-magnetic metal coated with a recording layer of nickel. In fixed positions closely adjacent the drum surface are disposed a number of pairs of recording/reproducing heads $M0^1$, $M1^1$, $M2^1$, $M3^1$ each of substantially conventional form, e. g. as used in magnetic tape recording, and dealing, one recording/reproducing head pair with a different circumferential strip or track M0, M1 . . . around the drum.

The drum is constantly rotated by an electric driving motor 160 and its speed of rotation is adjusted so that each endless track contains a recording of an integral number of instruction or number words which are inserted in and reproduced from the drum in precise timing synchronism with the digit periods and beat interval times of the machine rhythm as determined by the Clock pulse generator CPG, Fig. 23. For this purpose the drum is provided with a separate time marker track MX in which are recorded pulse signals marking the end of each word position relative to the heads $M0^1$ . . . $M1^1$. Signals from this track, picked up by the head 189 are amplified in a preamplifier 161 and then in a main amplifier 162 before being fed to a phase discriminator circuit 163 where they are compared in timing with signals developed in a square wave generator 164 from the Blackout waveform. The motor is arranged inherently to drive the drum slightly faster than the correct synchronous speed and is restrained to a variable extent by an electromagnetic brake 165 which is energised by a current whose value is adjusted by the discriminator circuit 163 in accordance with any measured phase divergence so as to correct the drum position at any time.

For the purpose of temporarily suspending the synchronising control under certain conditions, e. g. during recording upon the drum, the amplifier 162 may be disabled by a suitable suppression bias voltage applied on lead 162a thereby to inhibit the supply of timing pulses.

Selection of the required one of the plurality of recording heads is effected by a relay tree circuit 35 of conventional form operated by relay magnets such as indicated at 170, 171 which are energised selectively in the required manner by the outputs from the particular track selecting sections (14–24) of a staticisor.

The energising currents for effecting recording are developed from the incoming pulse signal train on lead 172 in a power amplifier circuit or write unit 34 which is also provided with a suppressing bias control lead which is supplied, according to whether the write unit is to be operative or not, from a special (D digit) section of a staticisor MST so as to be effective only when transfer is inwards to the drum.

The reproducing heads are selected in similar manner in a tree circuit 10 likewise controlled by the track selecting sections of a staticisor and the output from the selected head after amplification, is suitably reshaped in the read unit 116 to reconstitute pulse signal trains of the form shown in Fig. 24(k). The read unit contains bias suppressing means, similar to the write unit 34, and also controlled by the D digit section of the said staticisor so as to be operative only when transfer is from the drum.

Figure 1:
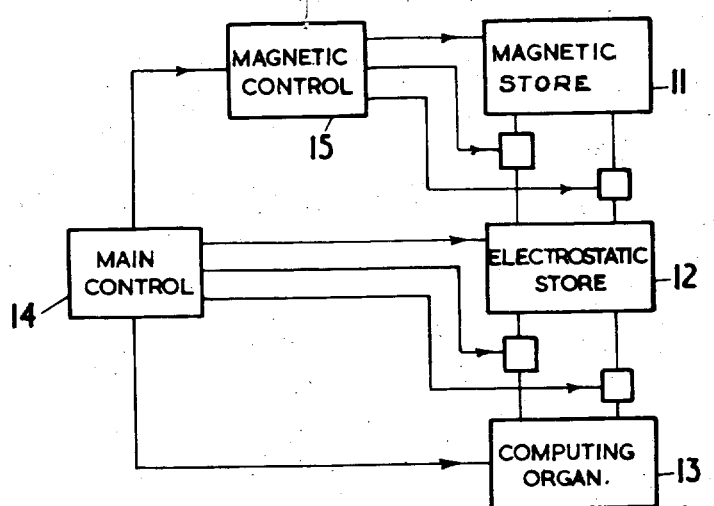

Figure 1 is a block diagram showing the main elements of a complete computing machine involving a magnetic subsidiary and an electrostatic high speed store. Data may be passed in either direction between a magnetic store 11 and an electrostatic store 12 and in either direction between the electrostatic store 12 and a computing organ 13. The main control unit 14 controls all the operations of the machine and although it controls the operation of the electrostatic store and computing organ directly, it controls the operation of the magnetic store and transfer of data to and from the electrostatic store only through the magnetic control unit 15. This arrangement is used due to the greater storage capacity of the magnetic store requiring a more detailed control instruction than is required by the rest of the machine.

The general working of the whole machine is briefly as follows. Digital data is first loaded into the machine for initial storing in the magnetic store 11 from a loading or input unit which may utilize the electrostatic store 12 and computing organ 13 if the machine is not required to be able to perform a computing operation while digital data is being fed into the magnetic store 11. A block of information which will include both number words and instruction words will then be supplied to the electrostatic store and various computations will be performed on this block of information. Any partial answers resulting from these computations may be transferred to the magnetic store for temporary or permanent retention. Further blocks of information will be transferred from the magnetic store to the electrostatic store as the computation proceeds when required and when storage space in the electrostatic store becomes available.

As described previously with reference to Fig. 19 the electrostatic store consists of a number of cathode ray tubes each storing words on each of a number of parallel lines which constitute a raster on the screen of the tube. These rasters are produced by the action of electron beams and words are written into or read from a line of a raster during action beats or periods while words stored on a line are regenerated during scan periods which occur alternately with the action periods. In its dynamic form a word is a pulse pattern and in this specification the presence of a pulse will be indicated by the digit 1 and the absence of a pulse by the digit 0. Pulses will in general be assumed to be negative-going from a normal datum level and throughout the specification will be described as having a duration of 6 microseconds while the time period between the beginning of two consecutive pulses (called the digit period) is 10 microseconds. Each raster will be described as consisting of 32 parallel lines each storing 40 digits.

Due to the incorporation of the magnetic store in the computing machine the capacity of the electrostatic high speed store can be reduced so that an instruction word of less than 20 digits is sufficient to specify a high speed storage address limited to 256 40-digit numbers and the 32 functions of the machine, so that such an instruction word occupies half a line of 40 digits. In the case of a magnetic instruction an address in the magnetic store, an address in the high-speed store, and a magnetic function code which controls the mechanism of transfer have all to be specified. The size of this instruction will be greater than the ordinary 20 digit instruction, for the capacity of the magnetic store is greater than and will, therefore, require a longer address system than the electrostatic storage.

There are two possible courses open for the inclusion of the new magnetic instruction in the complete system. The first method is to construct an entirely new instruction of 20 digits along the following lines. An existing "b" digit which controls an instruction modifying facility known as the B-tube is left as it is. Then follows the "e" digits which specify the line address in the high speed storage and in the case of 4 cathode-ray tubes each having 32 lines entails 7 digits. Following this would be the "m" digits which specify the address in the magnetic store, and finally the function digits "f." The possible functions of the machine would now be increased by the addition of all the magnetic operations so that a 6 digit code giving coverage of 64 functions in all would have to be employed. With no extension of high-speed storage therefore only 6 digits would remain which would be able to specify a total magnetic storage of only 64 tracks.

If more space is required the instruction could be extended to 40 digits but as the number of magnetic operations is relatively limited a large amount of the instruction word would be wasted in specifying codes which were never operative under transfer conditions. This type of instruction would, however be perfectly general, no distinction being made between an ordinary machine operation and a magnetic transfer.

The second method viz the method according to the present invention which will now be fully described appends an extension to the ordinary machine instruction which contains all the data relative to the required magnetic operation. Thus the ordinary instruction or as it now becomes, the pre-instruction will be unmodified except for the provision of a special five digit function code which is employed when any magnetic operation is required. Attached to this pre-instruction will be a 40 digit number, the actual magnetic instruction, which includes the magnetic store address, the high-speed store address and the code of the magnetic function required so that the complete instruction will occupy 60 digits. The form of the complete instruction is as follows. The pre-instruction of 20 digits is used to set up the electrostatic staticisors as shown in Figure 2 containing the usual "b" digit which may be used if required to modify the pre-instruction at the control of the B-tube, followed by the line or "e" digits which specify the line address of the line containing the 40 digit magnetic instruction proper, which may be placed anywhere in the high-speed store. The function or "f" digits which complete the pre-instruction are used to set up the f-staticisor sections in accordance with the particular code which instructs the machine to prepare itself for a magnetic transfer and to receive the remainder of the magnetic instruction. The pre-instruction is read and obeyed first by the normal control circuits which under the control of this instruction select the 40 digit complement instruction from its normal place of storage in the high speed store.

The main control unit 14 (Figure 1) will comprise staticisors for organising transfers from and to the high speed store and computing organ and these staticisors will be hereinafter referred to collectively as the electrostatic staticisors. The magnetic control 15 (Figure 1) will also comprises staticisors for organising transfers between the high speed and the subsidiary stores and these staticisors will hereinafter be referred to collectively as the magnetic staticisors. Both the electrostatic and the magnetic straticisors will comprise various sectional staticisors which will be called by their appropriate names. The magnetic instruction is used to set up the magnetic staticisors MS in Figure 2 and as shown has three parts: the magnetic address, the address of the electrostatic tube, and the magnetic function. These elements are placed in blocks of five digits in order to facilitate coding of the binary information into tele-printer form. In the particular machine being described the first three blocks (i. e. digit positions 0-14) are left vacant and the next two blocks of five digits (digit positions 15-24) are used for the magnetic address the digits 15-20 only being employed to specify the 64 tracks employed in the machine being described, but there being sufficient surplus digits to specify a total of 1024 tracks which allows for considerable expansion. The following block comprising digits 25-29 is used to specify the particular cathode ray tube of the electrostatic store, each store containing 2 tubes because of the alternation of action and scan beats in a cathode ray tube store, although if all five digits were used 32 tubes could be specified. The digit block 30-34 is employed to define the magnetic functions in a manner which will be described in detail later. The method of coding employed for these functions is one in which each digit controls certain operations in the magnetic transfer system. The coding is therefore a logical one determined by the operations required in any complete function. This method of coding is not as economical as the method employed in the normal computing operation of the machine, for certain combinations are ambiguous and others forbidden. In practice out of the 32 possible combinations which can be obtained from the five digits only 18 are of any significance. From an engineering stand-point however the system has its advantages for a single digit or staticisor may be employed to control various operations where a decoding valve is required in the other system. Due to the 40 digit length of the instruction the extra digits required for this method of coding may readily be spared, and the size of both permanent and high-speed storage may both be extended substantially.

The manner in which a magnetic instruction becomes effective will now be explained by means of the following example with reference to Figure 2. In operation the machine first obeys instruction 0 stored on line 0 of cathode ray tube T0 in the main electrostatic store 21 in one bar of four beats and then proceeds in order down the list of instructions in the normal manner until instruction 7 which is a magnetic pre-instruction is reached. The next bar starts at the beginning of the first scan beat S1 marked by the release of a prepulse as previously described with reference to Fig. 21. During the S1 beat a "1" is added to the C. I. line on the control tube 20 bringing the number stored on this line to 7, the address of the instruction to be obeyed in this bar. This control instruction is simultaneously fed to the electrostatic staticisor ES and the line staticisors are set up to select the line. The following beat is the action beat A1 and the contents of the selected line 7 in tube T0 are read into the P. I. line of the control tube 20 through the outwards transfer gate 22. During the second scan beat S2 access to the store 21 is again closed and the instruction word from line 7 of tube T0, now stored on the P. I. line is fed into the electrostatic staticisors ES. The information stored on these staticisors is now of the form shown in Figure 2. The line staticisors will store the address of the complete magnetic instruction which is, in the example given, line 28 on tube T0 and the function staticisors will store the magnetic code 00000 and trigger the magnetic transfer control 24. The line staticisors will immediately select the line 28 while the function staticisors will prepare the machine for the reception of the 40 digit magnetic instruction and the magnetic transfer which follows. During the A2 beat and the following beat (hereinafter referred to as A3) the contents of line 28 are read from tube T0 in the main store. Access to the control tube 20 is blocked and the information enters the magnetic staticisors MS through the gate 23 which has been opened by the magnetic transfer control 24. In the block of magnetic staticisors there is a staticisor corresponding to each of the significant digits in the magnetic instruction as previously described. Thus there are track staticisors working on digits 15, 16, 17, 18, 19 and 20, a store staticisor on digit 25, and function staticisors working on digits 30, 31, 32, 33 and 34. At the end of the first four beats we have the address of the 40 digit instruction and the magnetic transfer code still stored on the electrostatic staticisors. The line staticisors are retriggered at this instant, but the function staticisors have operated the magnetic transfer control 24 which stops the normal operation of the machine for the duration of the magnetic transfer. In the magnetic staticisors however, there is stored the full magnetic instruction, the address of the track, the store, and the kind of transfer which is about to take place. In the particular example shown in Figure 2, the track address is 26, the store address is 1, and the magnetic transfer code is 10010.

The ensuing beats are occupied in the actual process of transfer and will be described when the apparatus involved in the transfer of data to and from the magnetic store is described. The electrostatic staticisors ES are all retriggered when the magnetic staticisors have been set up and the magnetic staticisors MS are reset when the transfer is terminated by the magnetic transfer control 24. A pre-pulse is then released and a new bar initiated and the machine will resume its normal operation when it obeys instruction 8 et seq.

We may now picture the complete control system as illustrated in Figure 2 as consisting of two branches, the previously existing main or normal control, and the added magnetic control. These two branches are roughly analogous, the buffer action of the P. I. line in the main control system is however not required in the magnetic control for, apart from store selection, there is no interaction on the control loading sequence. The magnetic control loading operation is controlled by the main control loading system in exactly the same manner as the main control loading system is supervised by the C. I. line. The loading sequence is therefore controlled, first by the C. I. line and then by the main control loading system.

The coding of the magnetic instructions is arranged so that the machine may be started on a new problem with a completely empty high-speed store. Thus, let the tube T0 be completely blank when the initial pre-pulse is released. During the S1 beat, 1 is added to the blank C. I. line so that line 1 is selected. During the A1 beat the contents of line 1 (which are 20 0's) are fed into the P. I. line. During the S2 beat the electrostatic staticisors are fed with this information and remain in the untriggered state. Therefore line 1 is again selected and a 00000 code is set up on the function staticisors. The 00000 code is chosen to represent the magnetic operation so that in the A2 beat the contents of line 0 are fed into the magnetic staticisors. The magnetic staticisors therefore remain untriggered. The track staticisors are set to select track 0 and the tube staticisors tube T0. The 00000 code in the function position is designed to signify an inward transfer of the scan lines of the selected track to tube T0 of the selected store. Therefore the scan line of track 0 will be transferred to tube T0 of store 0. When the transfer is complete the machine will select instruction 2 as stored on line 2. This line of information will have been furnished in the proceeding transfer so that the machine can now proceed with the actual problem or loading process. This consideration of loading procedure has determined the coding of the instructions to some extent.

Figure 3:
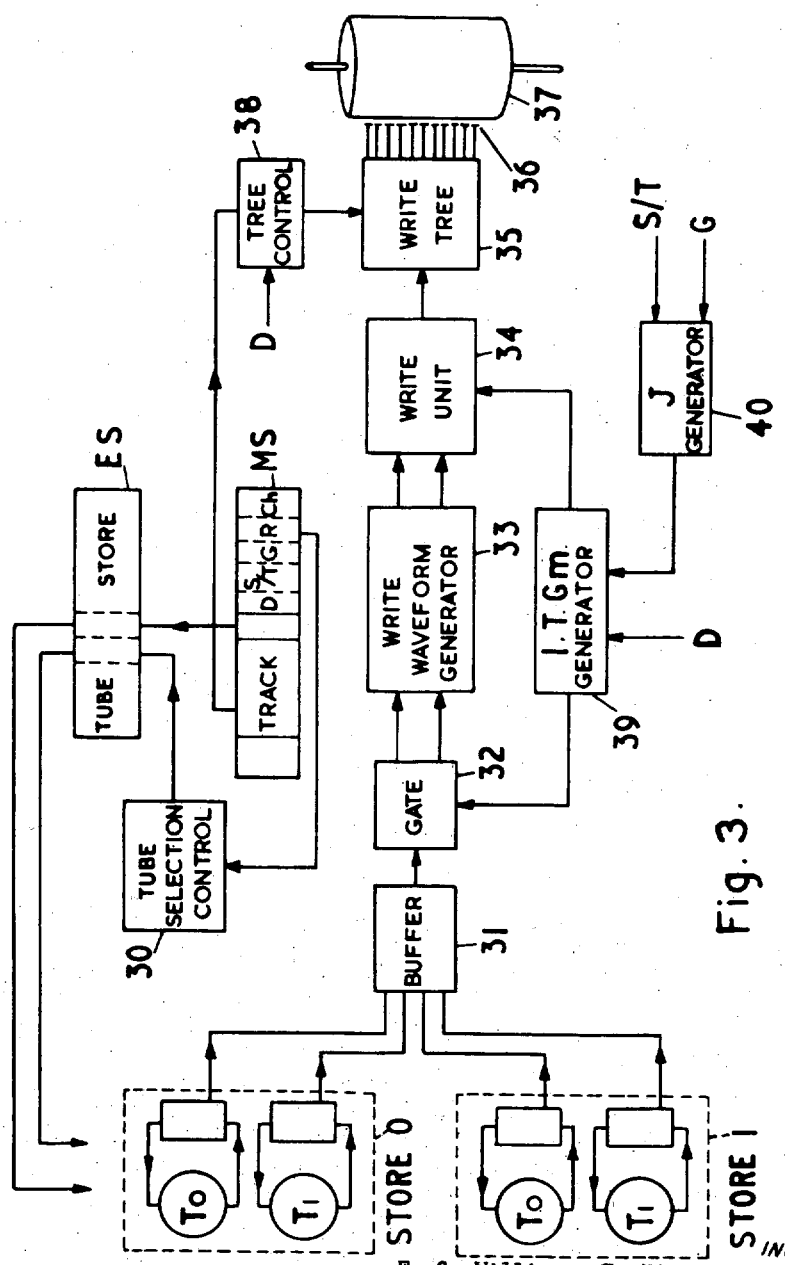

An outward transfer i. e. a transfer outwards from the electrostatic storage system to the magnetic storage system will now be described with reference to Figures 3 and 4. As shown in Figure 3 the electrostatic storage system consist of two stores 0 and 1 each consisting of two Williams' cathode ray storage tube units T0 and T1, which will be referred to as the even and odd tubes of a store respectively. Each tube stores 1280 digits, 40 digits on each of 32 lines making up a raster on the tube screen. The read output from each of these tubes is connected to the magnetic inward transfer gate 32 through the buffer circuit 31. The output of a store or tube, selected in a manner to be described later, is applied to the write waveform generator 33 and the write unit 34, which transform the read output of the selected tube or tubes into a form suitable for energising the electromagnetic recording heads 36 which impress the digital data onto the magnetic recording drum 37. As described previously with reference to Figure 22 the digital data is stored as a magnetisation pattern around the curved surface of the rotatable recording drum 37 along a number of parallel circumferential tracks. The transformed signal from the write unit 34 is applied to a selected recording head 36 through the write tree 35.

As shown in Figure 3 the passage of a digital signal from a selected store to a selected magnetic track is controlled by four (30 to 33) of the five magnetic function digits, D, G, S/T, and R. The fifth digit, the Ch digit is the so-called check digit whose function is to control the performance of a checking operation; it will be sufficient to state here that the Ch digit is 1 only when a special check operation is taking place so throughout this specification it will be assumed that the Ch digit is 0.

The function of the first four digits will now be explained.

The direction or D digit specifies the direction of transfer, electrostatic to magnetic or vice versa. When an outward transfer from the electrostatic to the electromagnetic store is required the D digit is a 1, so that as shown in Figure 3, the magnetic inward transfer gate 32 and the write tree 35 are opened, subject to the J waveform (to be hereinafter defined).

The Store/Tube or S/T digit specifies whether the contents of the whole of the store 0 or 1, whichever is selected by the store selecting digit in the electrostatic control, is transferred to the magnetic store or a selected one of the two tubes comprising the store. If the S/T digit is 1 the J waveform voltage is arranged to keep the gate 32 open and the write unit 34 operative continuously during the transfer period, and if the S/T digit is 0, the J waveform is arranged to keep the write path open for alternate scan or action beats so that the contents of only one or the two tubes can pass through to the magnetic store 37.

The G digit determines, when the S/T digit is 0, whether the J waveform voltage opens the write path during action beats or scan beats.

The R digit determines the order in which the two tubes or a store are scanned so that when the S/T digit is 0 in conjunction with the G digit, it determines which one of the two tubes in a store is transferred to the magnetic store and whether this transfer occurs in action or scan beats. When the S/T digit is 1 is determines the order in which the contents of the two tubes in the store are transferred.

The following table sets out the various types of outward transfer of digital data from the electrostatic store to the magnetic store and the corresponding codes of the magnetic function digits which direct these transfers.

| | Type of Outward Transfer | Magnetic Functions Digits | | | | |
|---|---|---|---|---|---|---|
| | | 30 | 31 | 32 | 33 | 34 |
| | | D | S/T | G | R | Ch |
| (1) | Tube T0 to a track during scan beats. | 1 | 0 | 0 | 0 | 0 |
| (2) | Tube T1 to a track during scan beats. | 1 | 0 | 0 | 1 | 0 |
| (3) | Tube T0 to a track during action beats. | 1 | 0 | 1 | 1 | 0 |
| (4) | Tube T1 to a track during action beats. | 1 | 0 | 1 | 0 | 0 |
| (5) | Tube T0 to a track during scan beats and tube T1 to a track during action beats. | 1 1 | 1 1 | 1 0 | 0 0 | 0 0 |
| (6) | Tube T0 to a track during action beats and tube T1 to a track during scan beats. | 1 1 | 1 1 | 1 0 | 1 1 | 0 0 |

As shown in Figure 3 the magnetic inward transfer gate 32 has a continuous input from the read output of the selected electrostatic store so that in normal operation the gate must be kept shut. The gate is controlled by a specially generated "Inward Transfer Gate Magnetic" voltage (I. T. Gm.). This voltage is produced by the I. T. Gm. generator 39 from another known as the J voltage produced by the J generator 40 which serves many functions in the system. This voltage has three distinct wave-forms as indicated in Figures 10(b), 10(c) and 10(d). In Figure 10(b) the waveform is negative-going for the whole period of transfer. In Figure 10(c) the wave-form is negative-going for scan periods during the actual transfer, and in Figure 10(d) negative-going during action periods during the transfer. The J generator 40 will be fully described with reference to Figure 31 when it will be seen that the three forms of the waveform are controlled by the Store-Tube (S/T) magnetic staticisor and the gating magnetic staticisor (G). Thus if the S/T digit in the magnetic instruction is 1 then the wave-form shown in Figure 10(b) is obtained. If the S/T digit is 0, then the wave-form shown in Figure 10(c) is obtained if G is 0 and the wave-form shown in Figure 10(d) is obtained if G is 1. When S/T is 1 the nature of the G digit is immaterial.

The I. T. Gm. voltage is derived from the J voltage by gating with the D digit as shown schematically in Figure 3. Thus if the D digit is 0 then a steady earth level is obtained while if D is 1 then the J voltage in any of its three possible forms as controlled by the S/T and G digits is applied to the inward transfer gate. Therefore during an outward transfer from the electrostatic store when D is 1 the transfer gate is controlled by the selected variant of the J voltage. Thus if S/T is 1 the gate will be opened for the complete period of transfer and the contents of the whole selected store will enter the magnetic storage system. If S/T is 0 and G is 0 this information will only enter the magnetic store during scan periods and if S/T is 0 and G is 1 then information will only pass during action periods. The significance of the actual information which passes during these scan and action periods also depends on the state of the R digit for, as previously described, this controls which tube of the pair involved in the transfer is scanned during action periods and which during scan periods. The digital data, gated by the inward transfer gate and the scanning sequence controlled by the S/T, G and R digits is now passed to the magnetic system proper.

The course of a specimen outward transfer operation will now be describd with reference to Figure 3. Figure 4 which shows the magnetic transfer control 24 in greater detail, and Figure 5 which shows voltage wave-forms produced by the apparatus shown in Figure 4. It will first be assumed that the end of the A2 beat has been reached and the magnetic staticisors are loaded with the necessary information. During this operation a unit known as the Fw trigger, labelled Fw in Figure 4, has been triggered by the 00000 code in digit positions Nos. 15 to 19 in the magnetic pre-instruction and the A2 gate voltage. The output Fw1 shown in Figure 5(c) is then used in the A2 beat to open the gate 23 in Figure 2 to the magnetic staticisors and it is also applied through the mixer 46 to suppress the pre-pulse occurring at the end of the A2 beat. The direction of the proposed transfer is not known until the D staticisor is loaded by the D digit. As already explained the convention is adopted that a 1 represents an outward transfer and a 0 an inward transfer because of the requirements of the initial loading process previously described. In the present case the state of the digit will be a 1 and the D staticisor is triggered. The D staticisor output opens the gate 41 and the negative level of the Fw1 voltage triggers the W trigger, the gate 42 is kept closed and no trigger is applied to the T trigger. The W trigger will be described in detail with reference to Figure 14 and it is sufficient here to say that it consists of a simple trigger circuit the retrigger pips of which are gated with a variable delay. Thus when the unit is triggered by the D staticisor the retrigger pips are suppressed by a delay device for a period of W milli-secs. When the delay is complete a retrigger pip enters and the W voltage wave-form reverts to its former state as shown in Figure 5(d). A voltage having a wave-form called the $W_0$ wave-form which is the inverse of the $W_1$ wave-form shown in Figure 5(d) and which therefore goes negative at this instant is used to trigger the next unit, the T trigger shown in Figure 4. This unit has the same construction as the W trigger but the delay employed is a more accurate delay circuit. This delay is adjusted accurately to count 15 retrigger pips allowing the 16th to reset the trigger and to give the resultant T voltage wave-form shown in Figure 5(e) of exactly 16 retrigger periods' duration. The retrigger period is of 4 beats' duration so that in all the delay T is of 64 beats' width. The T wave-form is employed for gating all the transfer operations, thus in Figure 5(e) the actual transfer only takes place at the negative level of the T1 voltage wave-form. The initial delay W is included to allow the relays employed in the writing head tree time to settle down. The delay T must be accurate if a complete raster of information is to be transferred.

Three voltage wave-forms Fw, W and T are therefore obtained at various stages of the operation of the magnetic transfer control, these are mixed and gated at various points to control the complete transfer. Thus a composite voltage wave-form shown in Figure 5(f) is obtained by mixing all three in the mixer 46, and it is used for suppressing pre-pulses during the complete magnetic transfer operation. The trigger Fw is reset at the end of the S3 beat by the counter wave-form CO shown in Figure 13 (c).

Figure 5:
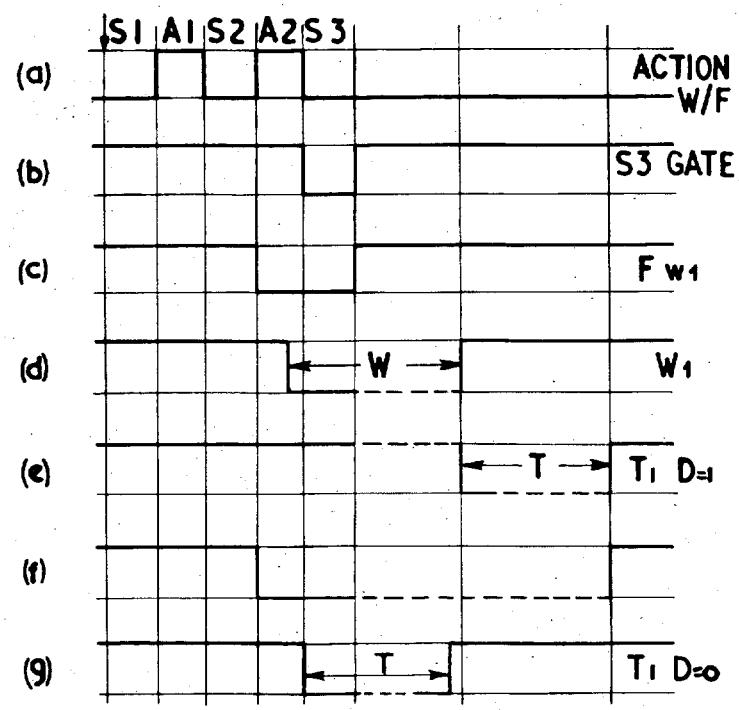
Figure 6:
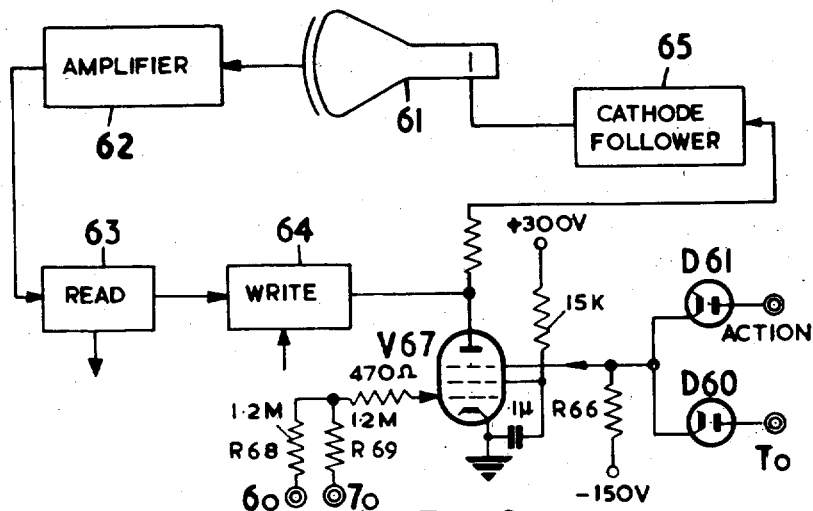
Figure 7:
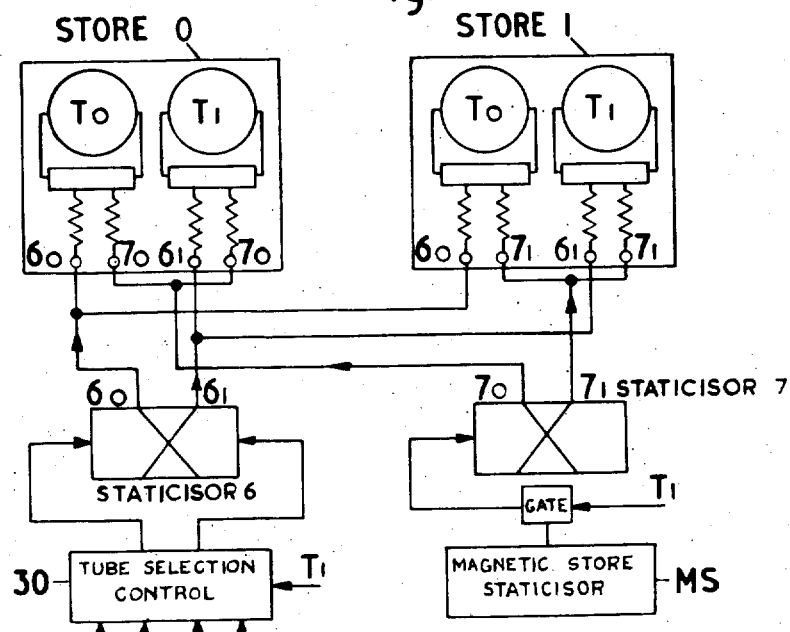

The selection of the tube in the electrostatic store whose contents are to be read out and passed to another part of the machine such as the computing organ on the magnetic store is performed by means of the blackout valve (valve V105, Fig. 19) contained in the gate circuit to the regenerative loop associated with each cathode ray tube store as previously described with reference to Figure 19. The regenerative loop on one of the tubes in the electrostatic store is shown in Figure 6 and consists of a Williams' cathode ray tube store 61, from which signals are picked up and passed to the read unit 63 and write unit 64 through the amplifier 62. The output of the write unit 64 is applied to the cathode follower 65 so that it may be applied to the grid of the tube 61 to modulate the electron beam in the tube. As described in the above mentioned application all the tubes in the store except the one into which digital data is required to be written into or read out from are arranged to be blacked out during action beats. This is carried out by means of the black-out valve V67 and the associated circuits including the "or" gate comprising diodes D60 and D61. When this value is fully conducting the cathode ray tube grid voltage is held at its most negative level and the tube is blacked out. Digital data cannot therefore be written into or read from a tube which has a conducting blackout valve. In the present case where four tubes are employed there are four black-out valves, one in the gate circuit to each regenerative loop and any three of these valves may be conducting, leaving the remaining tube bright and open to a transfer process. The selection of the respective valve is performed by means of resistance leaks such as R68 and R69, attached to the grid of each valve, such as V67. The leaks are attached according to the required operating code, to the outputs of electrostatic statiscisors 6 and 7. The staticisor output voltage swings between +120 v. and —10 v. so that both leaks have to be connected to negative potentials before the grid will be at a negative potential itself and the valve cut-off. The connections of this system are illustrated in Figure 7. In the course of normal machine operation tube selection is performed only during the first two action periods of any bar, so that to ensure that black-out may occur only during these periods, a voltage having an action wave-form is applied to the suppressor grid of the black-out valve V67 through the diode D61. This voltage waveform is given in Figure 5(a) and it is seen that the black-out valve suppressor grid will be positive only during the A1 and A2 beats so that the valve can be operative only during these periods.

For the purpose of a magnetic transfer the method of selection has to be considerably modified. In the first instance the period of blackout is much greater than the two action periods mentioned above and extends over the complete transfer time of 64 beats. The black-out wave-form applied to the cathode-ray tube grids will therefore be of this period. This means, of course, that during these 64 beats the data stored in the electrostatic store will not be regenerated but the stored charges will not be dissipated in the period involved, which is about 30 milli-seconds, because in the Williams' storage tubes data may be retained without regeneration for about 200 milli-seconds. The existing method of coupling to the cathode-ray tube grid had to be modified due to this increase of period so that the T0 voltage, having a waveform which is the inverse of the T1 voltage waveform, is applied to the suppressor grid of valve V67 through the diode D60.

The selection must also be divided into two classes, store selection and tube selection, both classes being controlled by the magnetic instruction. The required store is specified by the store address in the magnetic instruction which in the present case of two stores is a single digit. The mechanism of selection employed is to impress the state of the magnetic store staticisor upon the electrostatic store staticisor 7 for the duration of transfer. The output of staticisor 7 are therefore controlled by the magnetic instruction for the duration of transfer. Therefore, as shown in Figure 7, to select store 0 the magnetic store statiscisor MS is set to 0 and the output applied via a gate to the electrostatic staticisor ES7 as shown in Figure 7. When the gate is opened by the T1 wave-form voltage the staticisor ES7 is forced into the 0 state and the leaks $7_0$ are taken negative and the leaks $7_1$ are taken positive. Therefore store 1 is completely blacked out on both tubes while store 0 may be bright or dark at the control of the 6 leak. If we wish to select store 1 the 1 state is set up on the magnetic staticisor and is later impressed on staticisor 7 and so the selection leaks.

Having selected the required store it is now desired to select the pair of tubes in such a manner that the total contents of 2560 digits (twice 32×40 digits) be transferred to the magnetic wheel in 64 beats (twice 32 beats), to do this a special scanning sequence has first to be employed.

Figure 9:
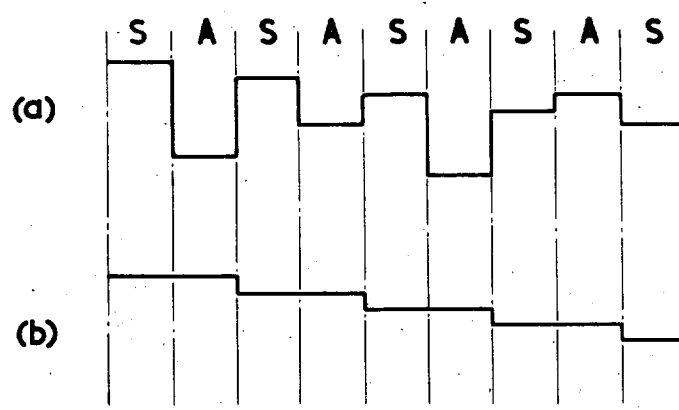

The existing scanning sequence of the electrostatic store is designed to meet the requirements of regeneration and accessibility, and as fully described in the above mentioned paper by Williams and Kilburn, the sequence is divided into two cycles, the scan cycles designed to meet the regeneration requirements and the action cycles designed to meet the access requirements. During scan beats the scan is sequential and a step wave-form is applied to the Y-plates, there being 32 levels corresponding to the 32 horizontal lines of the raster. During action beats the Y-deflection level may rest at any one of these 32 levels under the control of the line staticisors so that the scan line travels down the raster from line 0 to 31 in 64 beats altogether. A typical form of the Y-shift voltage in these circumstances is shown in Figure 9 (a).

For the purpose of a magnetic transfer it is desired to employ the whole 64 beats of both scan and action components. The normal requirement for line accessibility has disappeared and some type of sequential action line is required to supplement the normal sequential scan opeartion. This is accomplished by restraining the Y-shift voltage to be of the form shown in Figure 9 (b) where the action line remains at the same level as the scan line, so that each line in the raster is scanned twice. Employing the two tubes side by side in each store it is possible by suitable gating of the black-out voltage waveform applied to each tube to read from each tube in alternate beats so that using the special Y-scan sequence shown in Figure 9(b) it is possible to read corresponding lines in each tube in alternate beats. The modification required to the Y-scan generator will be described with reference to Figure 19. This special sequence of scanning is produced only during a transfer so that immediately a transfer is complete as defined by the T voltage wave-form the normal sequence is resumed.

Figure 8:
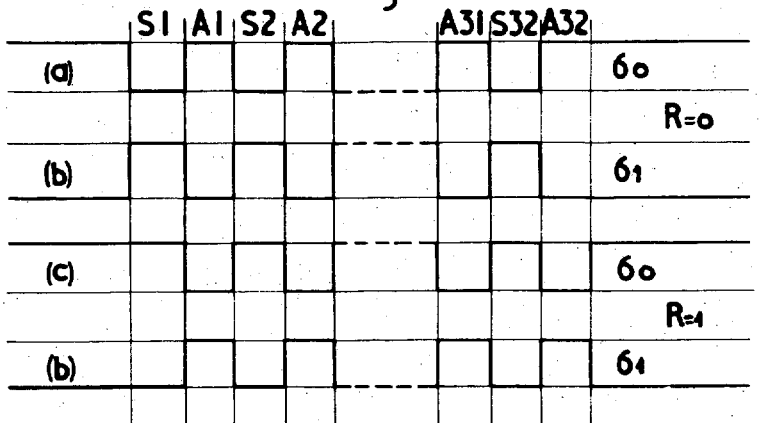

During a transfer operation the required alternative bright up of the two tubes in a store is obtained by applying a voltage having the wave-form given in Figure 8 to the tube selection resistance leaks of the black-out valves. The staticisor 6 is still retained to feed the resistance leaks but its action is controlled completely during the transfer period by the tube selection control 30 as shown in Figure 7. Figures 8(a) and 8(b) represent the $6_0$ and $6_1$ outputs of the staticisor 6 before a magnetic transfer set to select the even tube T0. During transfer voltages having a wave-form of halver frequency (i. e. the frequency of the wave-form shown in Figure 8(a)) are applied from the tube selection control 30 to the staticisor 6 and the two outputs are then determined by the R digit. At the end of transfer this external control is removed as the T1 voltage reverts to its normal level and the staticisor 6 resumes its normal state. The resultant effect of the voltage wave-forms shown in Figures 8(a) and 8(b) will be to brighten tube T0 in scan periods and tube T1 in action periods. Therefore using the special Y-shift voltage a line from tube T0 will be transferred during scan periods and a line from tube T1 during action periods. If the phases of the two signals are reversed as shown in Figures 8(c) and 8(d), the inverse will occur and digital data will be transferred from tube T0 during action periods and tube T1 during scan periods. The output of the R magnetic staticisor is fed into the tube selection control 30 in Figure 7 to determine which phase of these two wave-forms is applied to the staticisor 6 so that the "R" digit in the magnetic instruction controls the bright-up sequence of the two tubes.

The action of a typical transfer from a particular electrostatic store will now be described. The T voltage wave-form which defines the actual transfer starts at the beginning of a scan period (see Figure 5(g)) so that the first line transferred will be during a scan period. The position of the counters and therefore the scan line may be assumed to be random at this instant, say on line 7. Then if the R digit is 0 line $7_0$ in tube 0 will be transferred first followed by its counterpart line $7_1$ in tube 1 which is bright during action periods. If R is 1 however, tube 1 is bright during scan periods so that line $7_1$ is transferred first, and then line $7_0$ in the following action period. This process continues for a total of 64 beats when during the last action beat of the transfer either line $6_0$ or $6_1$ is transferred according to the state of the R digit. The subsequent scan beat will be in the normal scanning sequence and line 7 will be scanned.

As shown in Figure 3 this gated output of the gate 32 is fed through the write waveform generator 33 and write unit 34 to the selection tree 35 which has a single input and 64 outputs attached to the 64 recordings heads 36.

The selection of the relays is controlled by the D digit staticisor which allows selection to take place only when the D digit is 1. The relays are thus energized only when an outward or writing transfer is to take place so that the mechanical wear of the relays is cut down.

It should be noted that it would be possible to employ electronic writing heads each consisting of three miniature valves for example in order to obtain faster selection time and reliability and in a more developed system a compromise employing both relays and valves would probably be the most efficient arrangement.

The relay tree is set up in the delay period W as shown in Figure 5(d), and at the end of this period the selected write head 36 is connected to the write-unit 34 and the transfer proper takes place during the period T as shown in Figure 5(e). The digital data applied to the write unit 34 has already been controlled by the inward transfer gate waveform but it is necessary for the write unit itself to be similarly controlled as otherwise it would write a series of "0"s into the magnetic store during blank periods. The control voltage applied to the write unit 34 must be positive whenever the unit is required to write so the write unit is controlled by a voltage having a waveform called the inverse inward transfer magnetic waveform which is the exact inverse of the inward transfer magnetic waveform shown in Figures 10(b), 10(c) and 10(d).

The gating of the write unit and the applied digital data could if desired be extended so that only one selected line is written on.

A further control voltage is required during the actual writing process for application to lead 162a (Fig. 22) to suppress the pulses used to synchronise the rotation of the magnetic recording drum as previously described with reference to Figure 22. A voltage having a suitable waveform is obtained by arrangement for the T voltage waveform to be applied when the D digit is 1.

At the end of the transfer period which occurs when the T voltage shown in Figure 5(e) reverts to its positive level the various gates in the magnetic system are immediately closed, the write unit is de-energized and the relays in the write tree revert to select track 0. In the electrostatic store the normal scanning sequence is resumed and the selection of the tubes is made by the electrostatic staticisors. At the end of the first beat of the new operation all the magnetic staticisors are reset and the whole of the magnetic transfer operation is completed.

Figure 11:
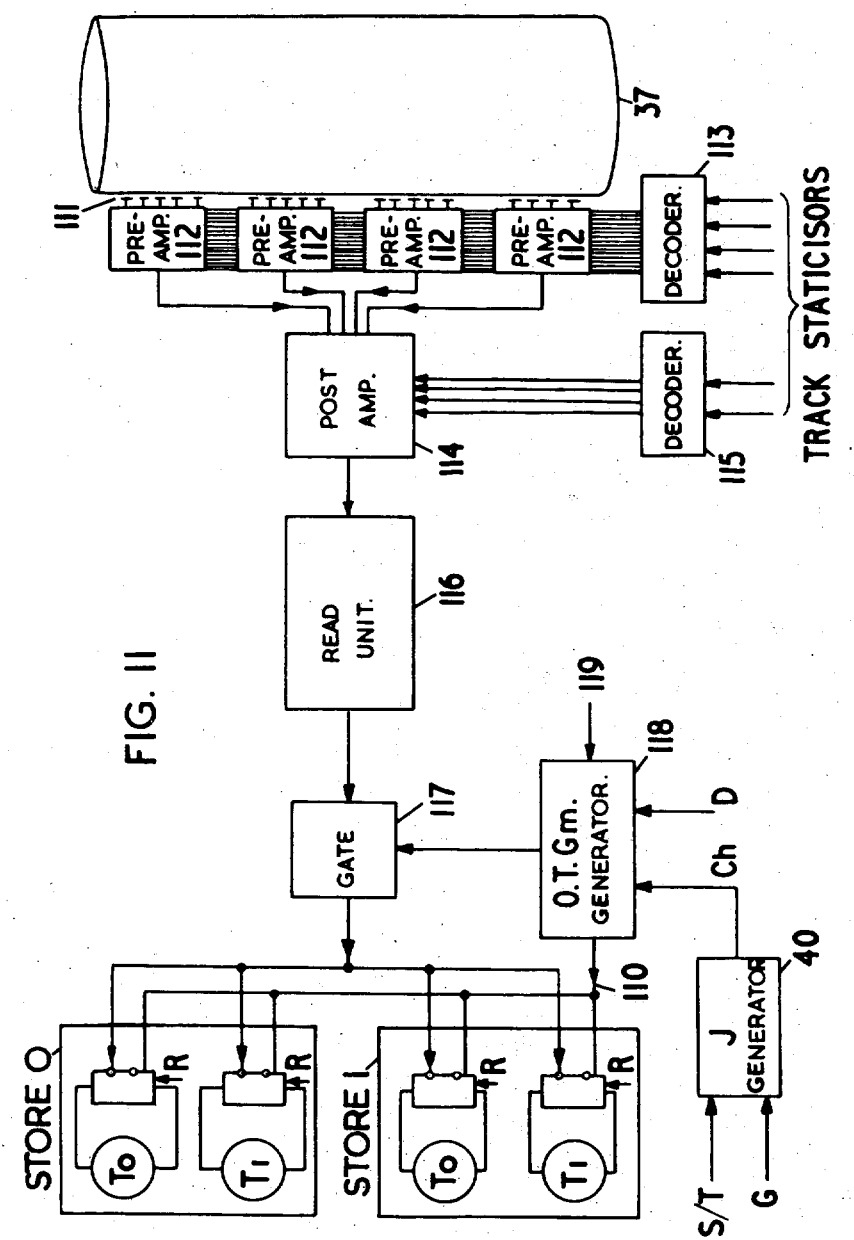

An inwards transfer operation i. e. a transfer from the magnetic storage system inwards to the electrostatic storage system will now be described with reference to Figures 4, 5 and 11. As shown in Figure 11, 64 reading heads 111 co-operate with 64 recording tracks on the magnetic recording drum 37. Each reading head is connected to a single valve preamplifier. The pre-amplifiers are assembled in four groups of 16 shown in Figure 11 as the blocks 112. One pre-amplifier in each group is selected by the pre-amplifier decoder 113 which is controlled by the least significant magnetic address digits 15, 16, 17 and 18 from the magnetic staticisors MS already described in connection with Figure 2. Four output signals will therefore be obtained and these are applied to the four sections of the post-amplifier 114. One of these four sections is selected by the post-amplifier decoder 115 which is controlled by the magnetic address digits 19 and 20 from the magnetic staticisor MS so that finally the output of one reading head 111 out of 64 reading heads is selected and applied to the read unit 115. The number of tracks could be increased to 256 by arranging for 16 blocks, each comprising 16 pre-amplifiers as before, to feed into a post-amplifier having 16 sections controlled by digits 19, 20, 21 and 22 in the magnetic instruction.

The pre-amplifier valves in each group may conveniently be connected to a common anode load. In this case however each group will have a capacitative load on its common anode due to the distributed character of the connecting leads. During a change of address the anode current will change abruptly and the resulting voltage surge at the anode will pass through all the decoding circuits so that it may be necessary to incorporate a heavily damped resonant circuit in the anode load.

The read unit 116 is thus continuously supplied with signals which it converts into a form suitable for supplying to the rest of the machine. When the magnetic staticisors are not loaded with a magnetic address number track 0 will automatically be selected and the read unit 116 will be continuously supplied with the contents of track 0.

The converted signals from the read unit 116 are supplied to the magnetic outward transfer gate 117 through which they are fed when required to the write input of an electrostatic tube or store selected in a manner already described in connection with the outward transfer process. The gate 117 is controlled by the outward transfer gate magnetic voltage (O. T. Gm.) generated by the outward transfer gate magnetic waveform generator 118 which is controlled by the D digit and the S/T and G digits through the J waveform generator 40, while the tube in the electrostatic store is selected by the R digit. When the D digit is 1 the transfer of signals representing digital data from the read unit 117 to the electrostatic store is prevented and when the D digit is 0 one of the various forms of the J voltage shown in Figures 10(b), 10(c) or 10(d) control the passage of information through the gate. The input 119 to the generator 118 is the voltage which suppresses the reading of the digital data stored on a tube when data is being written onto the tube during normal operation of the machine. This is passed through the generator 118 in a manner which will be fully described with reference to Figure 33 so that the output 110 suppresses the reading of data from the tubes when data is being transferred to the tubes from the magnetic store.

The function of the D, S/T, G and R digits is exactly as already described in connection with the outward transfer process and the following table sets out the various types of inward transfer of digital data from the magnetic store to the electrostatic store and the corresponding codes of the magnetic function digits which direct these transfers.

| Type of Inward Transfer | Magnetic Function Digits | | | | |
|---|---|---|---|---|---|
| | 30 | 31 | 32 | 33 | 34 |
| | D | S/T | G | R | Ch |
| (1) A track to tube T0 during scan beats. | 0 | 0 | 0 | 0 | 0 |
| (2) A track to tube T1 during scan beats. | 0 | 0 | 0 | 1 | 0 |
| (3) A track to tube T0 during action beats. | 0 | 0 | 1 | 1 | 0 |
| (4) A track to tube T1 during action beats. | 0 | 0 | 1 | 0 | 0 |
| (5) A track to tube T0 during scan beats and to tube T1 during action beats. | 0 0 | 1 1 | 1 0 | 0 0 | 0 0 |
| (6) A track to tube T0 during action beats and to tube T1 during scan beats. | 0 0 | 1 1 | 1 0 | 1 1 | 0 0 |

During an inward transfer when digital data is actually being written into a selected Williams' tube it is necessary to suppress the normal regeneration of the data stored therein as the normal scan-action cycle is disrupted as it is during an outward transfer. The black-out valve V67, shown in Figure 6, therefore has the inverse O. T. Gm. voltage applied to its suppressor grid which is therefore driven positive whenever data passes through the gate 117.

Figure 4:
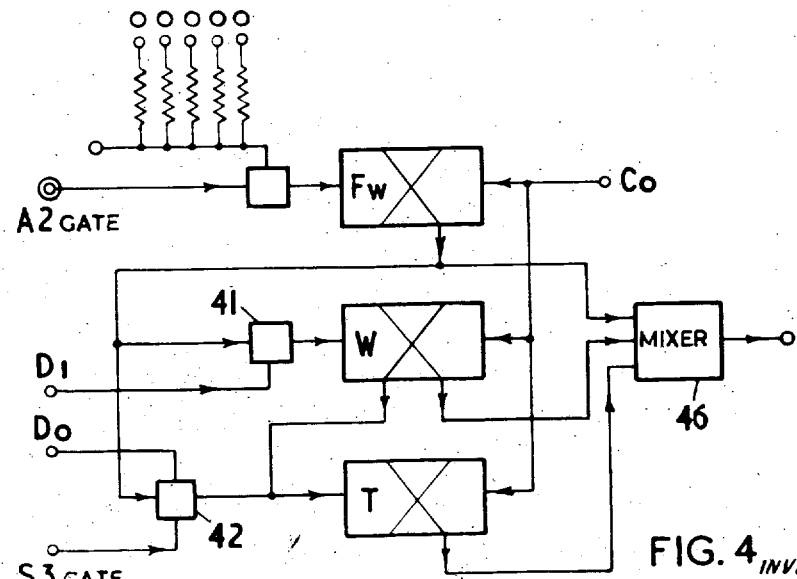

The control of the time and duration of a reading or inward transfer is carried out by means of the apparatus shown schematically in Figure 4. The operation of this apparatus when used to control a writing or outward transfer has already been described but its operation when used to control an inward transfer is different in that no delay time W is necessary to allow time for the valves in the read tree to act as in the case for the relays in the write tree. The operation of the controlling apparatus shown in Figure 4 during an inward transfer will now be described. As the D digit is now 0 the gate 41 is closed and the gate 42 is opened. The W trigger therefore remains untriggered and the FW trigger operates the T trigger directly. Thus at the end of the A2 beat the S3 gate voltage waveform shown in Figure 5(b) goes negative and triggers the T trigger which remains triggered until it is reset at the end of the transfer period as shown in Figure 5(g). This period is accurately timed by a delay circuit which will be described with reference to Figures 16 and 17.

A more detailed description of the various parts of the apparatus involved in the magnetic storage system which have not been previously described or referred to, will now be described with reference to Figures 12 to 17 and 29 to 34.

Figure 12:
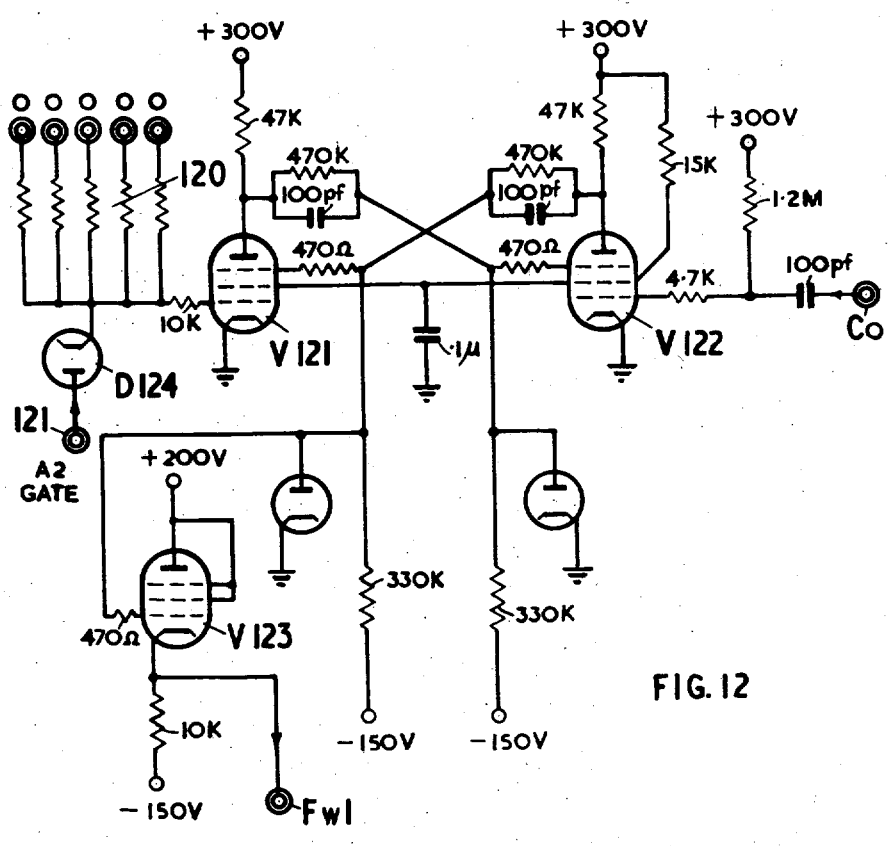
Figure 13:
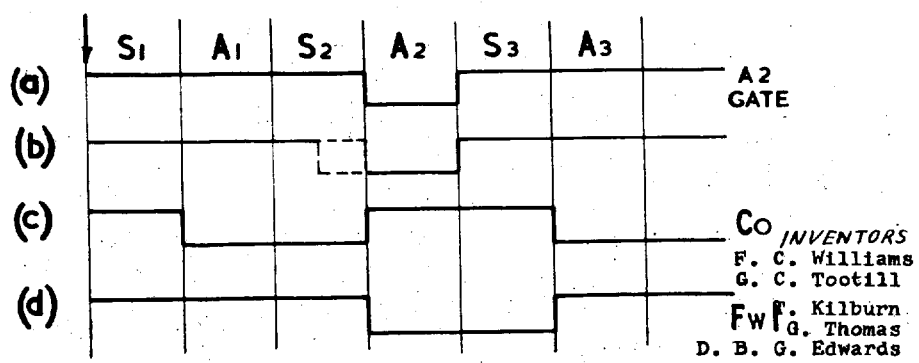

Circuit details of the FW trigger shown in Figure 4 are shown in Figure 12 and explanatory voltage waveforms are shown in Figure 13. The valves V121 and V122 form an anode to suppressor-grid coupled trigger which is triggered in a controlled manner at the grid of valve V121 by the application at terminal 121 of the A2 gate voltage shown in Figure 13(a) when the 0 outputs of the electrostatic function staticisors are all negative. The trigger is reset repetitively on the grid of valve V122 by a series of trigger pips generated from the negative-going edge of the voltage waveform Co shown in Figure 13(c). Each of the five resistance leaks attached to the grid of valve V121, taken to the 0 outputs of the function staticisor of the electrostatic staticisor ES, are therefore connected to —10 volts when the function staticisors are in the untriggered or "0" state and 120 volts when they are in the triggered or "1" state. When the function code 00000 is set up on the function staticisor the grid of the valve V121 is allowed to go negative during the A2 beat when the A2 gate voltage is applied to the anode of diode D124. The resistance leaks will all be connected to negative potentials either in the middle of the S2 beat or at the end of the beat depending on which half of the line the instruction is stored upon, as illustrated in Figure 13(b). The output voltage waveform $Fw1$ then goes negative and stays negative until the trigger is reset at the end of the S3 beat by the negative going edge of the Co voltage as shown in Figure 13(c). The cathode follower valve V123 feeds the $Fw1$ signal to other parts of the equipment.

Figure 14:
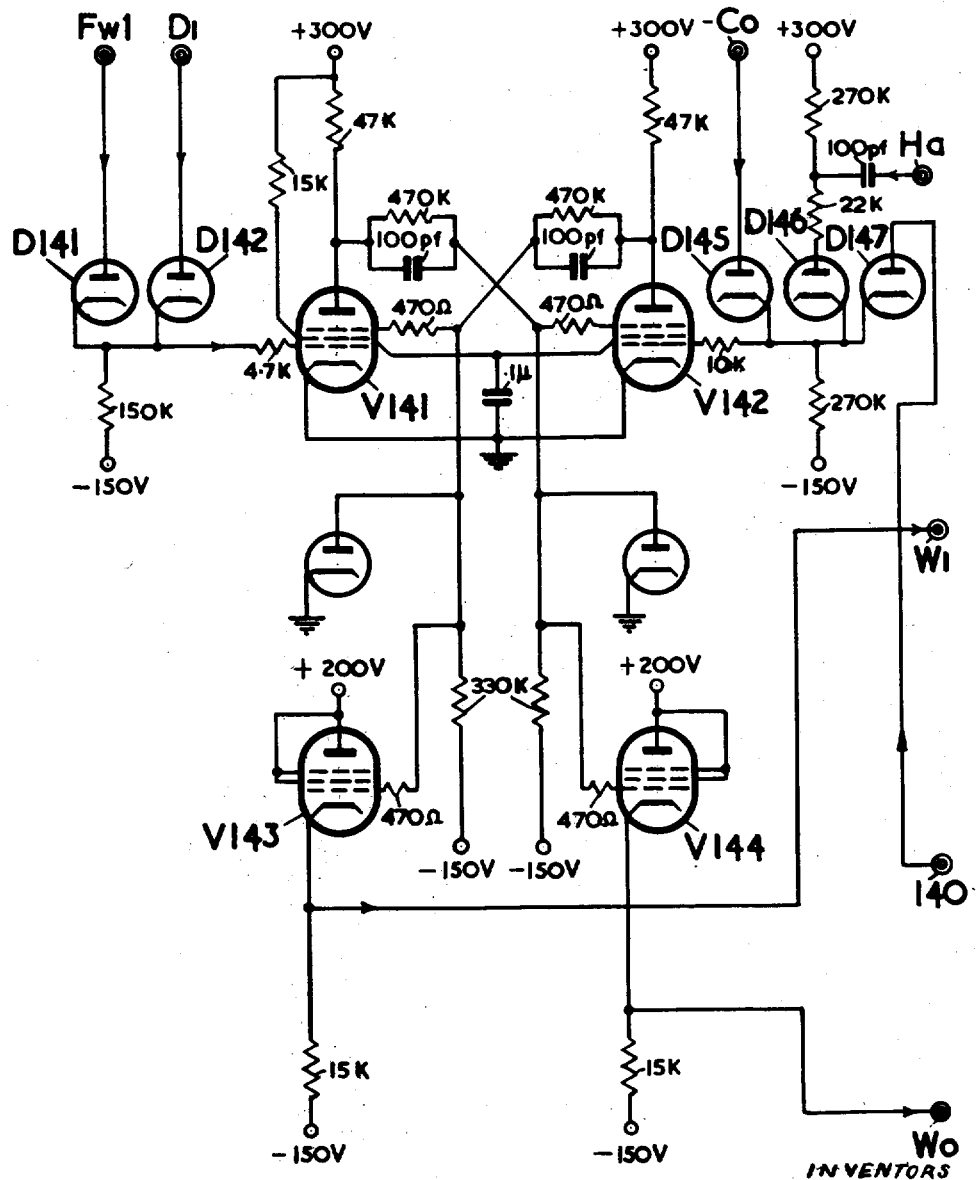
Figure 14:
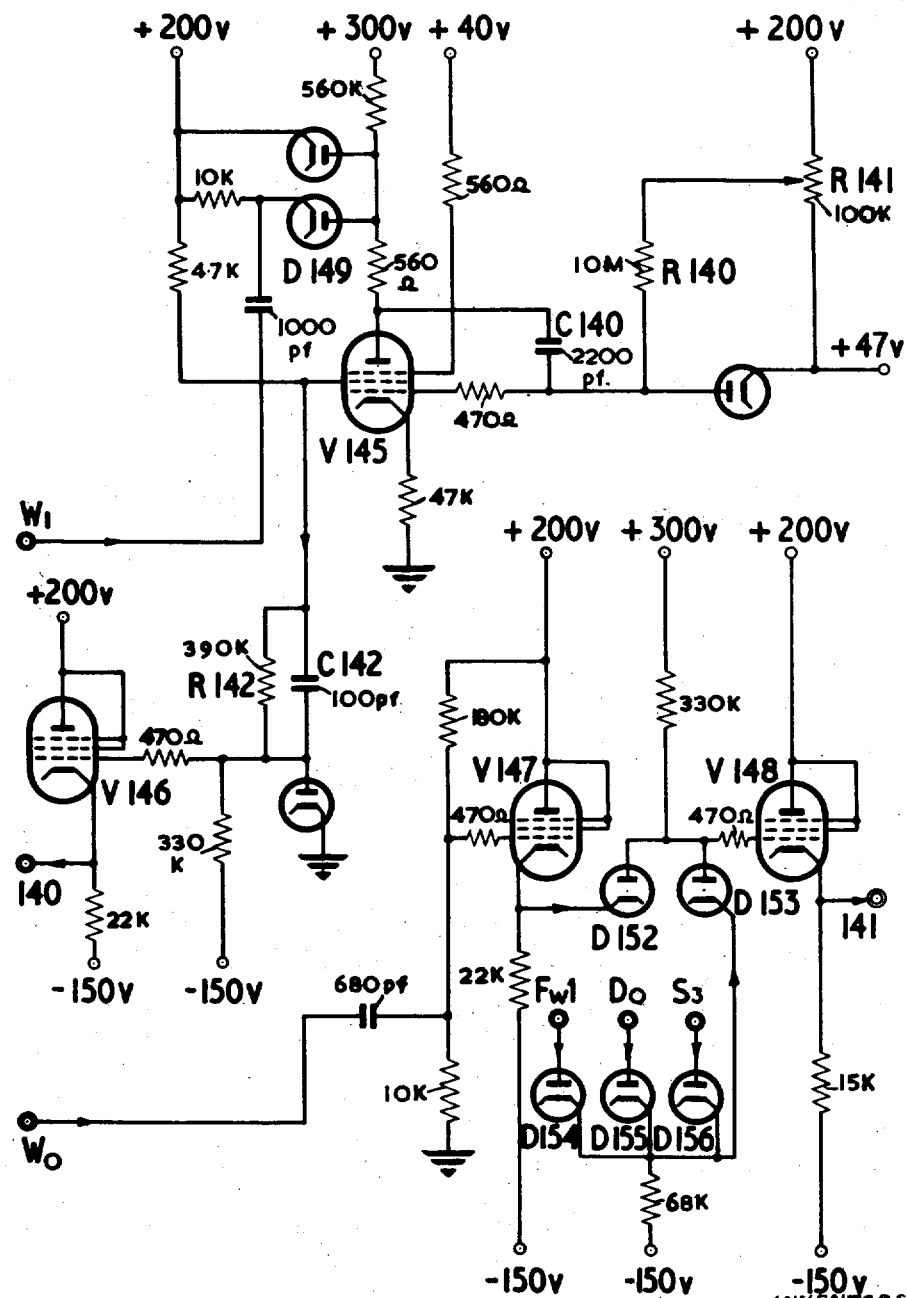
Figure 15:
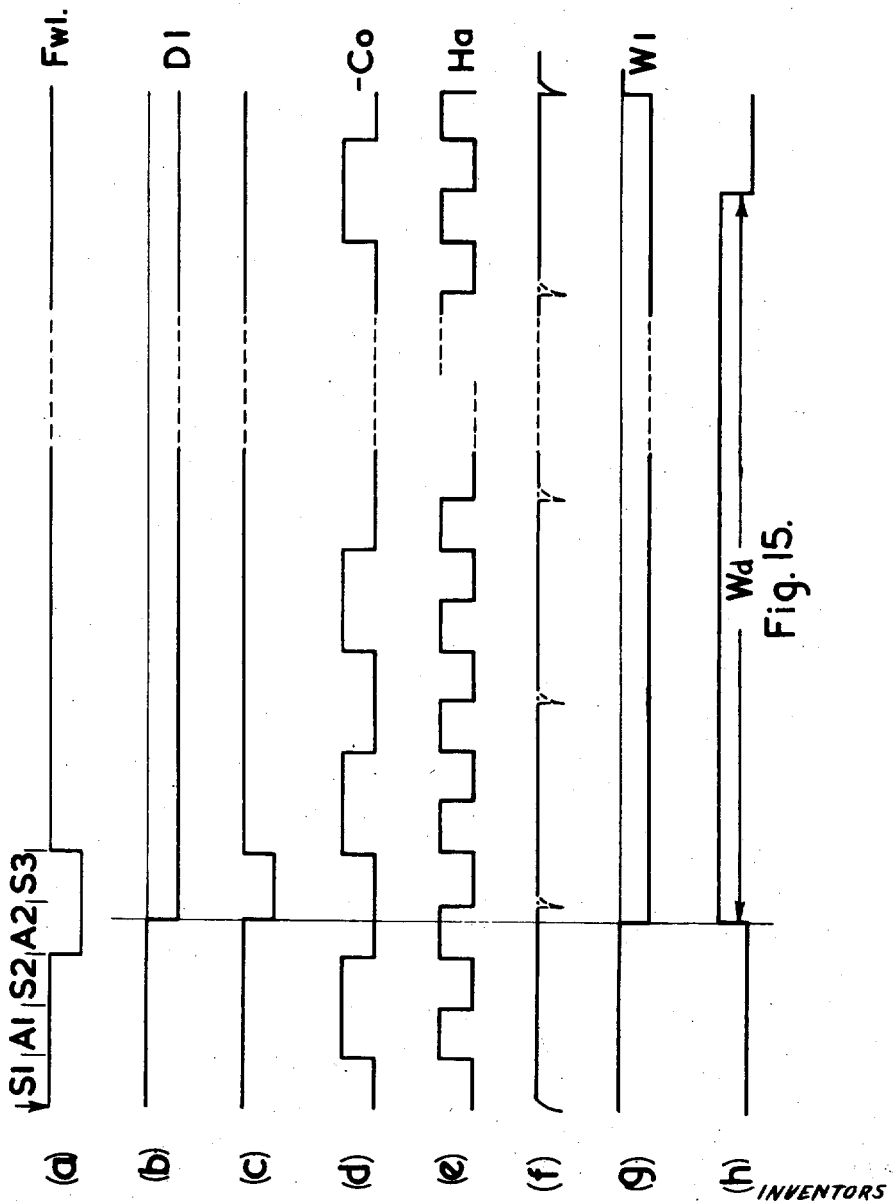

Circuit details of the W trigger shown in Figure 4 are shown in Figure 14 and explanatory voltage waveforms are shown in Figure 15.

The unit consists of a trigger comprising valves V141 and V142. Trigger pips are applied to valve V141 to set the circuit to its triggered state while a Phantastron delay circuit comprising valve V145 is used to suppress a continuous series of retrigger pips which are otherwise applied to valve V142 for a fixed time period after which the trigger is reset by the first of the released retrigger pips. The grid of valve V141 is triggered when the cathodes of diodes D141 and D142 are both taken negative. As shown in Figure 15(a) the $Fw1$ voltage is taken negative during the A2 and S3 beats of a transfer operation. The D1 voltage goes negative as shown in Figure 15(b) if the D digit is a 1 when the D digit is read into the D staticisor in the magnetic control so that the voltage on the grid of valve V141 will be as shown in Figure 15(c). If the D digit is a 0, the D1 voltage remains positive and the W trigger is not triggered. The W trigger is therefore triggered when the D digit is set up and the W1 voltage waveform goes negative at this instant as shown in Figure 15(g). The negative going edge of the W1 voltage produces a negative pulse on the anode of the Phantastron valve V145 through the diode D149. The anode voltage will immediately commence to fall at a rate controlled by the condenser C140 and the resistance R140 to a variable potential on the potentiometer R141 connected between 200 v. and 47 v. The screen current falls in the valve and the screen voltage rises. This rise pulls the grid of valve V146 to earth potential through the D. C. connecting chain comprising the condenser C142 and resistance R142, and the cathode of D147 on the retrigger grid of valve V142 in the trigger is held positive through the terminal 140. The trigger pips specially generated are therefore suppressed and the trigger retains its triggered state. The retrigger pips shown in Figure 15(f) are obtained on the grid of valve V142 by applying the differentiated form of the halver action voltage $Ha$ shown in Figure 15(e) to the anode of diode D146 and the —Co voltage shown in Figure 15(d) to the anode of diode D145.

The potential on the anode of V145 finally reaches its minimum value and the cathode potential rises above the suppressor grid potential and the anode current cuts off. The anode current diverted to the screen increases the screen current and the screen voltage falls so that the grid of valve V146 is taken —20 v. negative. The first retrigger pip occurring after this release retriggers the W trigger. Figure 15(h) shows the voltage waveform on the cathode of valve V146. The delay $Wd$ may be controlled between 20–140 millisecs. by varying the position of the tap on the potentiometer R141.

The cathode follower valves V143 and V144 feed the two output voltages W1 and its inverse W0 to the rest of the equipment. The negative going edge of W0 at the end of the delay period is differentiated and fed through the cathode follower valve V147 and the diode D152 to the grid of the cathode follower valve V148. The cathode output point is connected to the grid of the T trigger via the terminal 141 so that the T trigger is triggered after the delay time W. If the D digit is 0, then the T trigger is already triggered at this time as the And gate comprising the diodes D154, D155 and D156 and shown as 42 in Figure 4 produces a negative pulse during the S3 beat which is applied through the diode D153 to the cathode follower valve V148. A trigger pip is therefore obtained from the valve V148 and applied to the T trigger after a delay W if the D digit is 1 or during the S3 beat if the D digit is 0.

Figure 16:
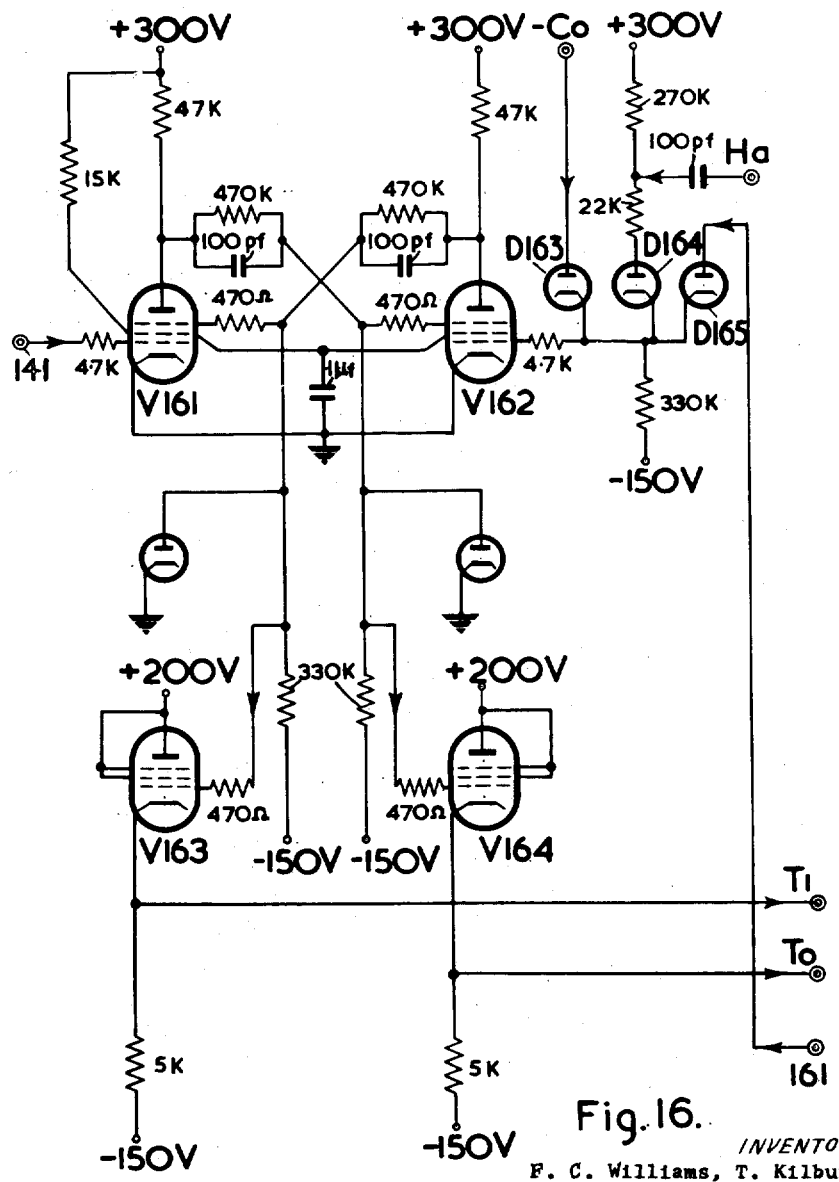
Figure 16:
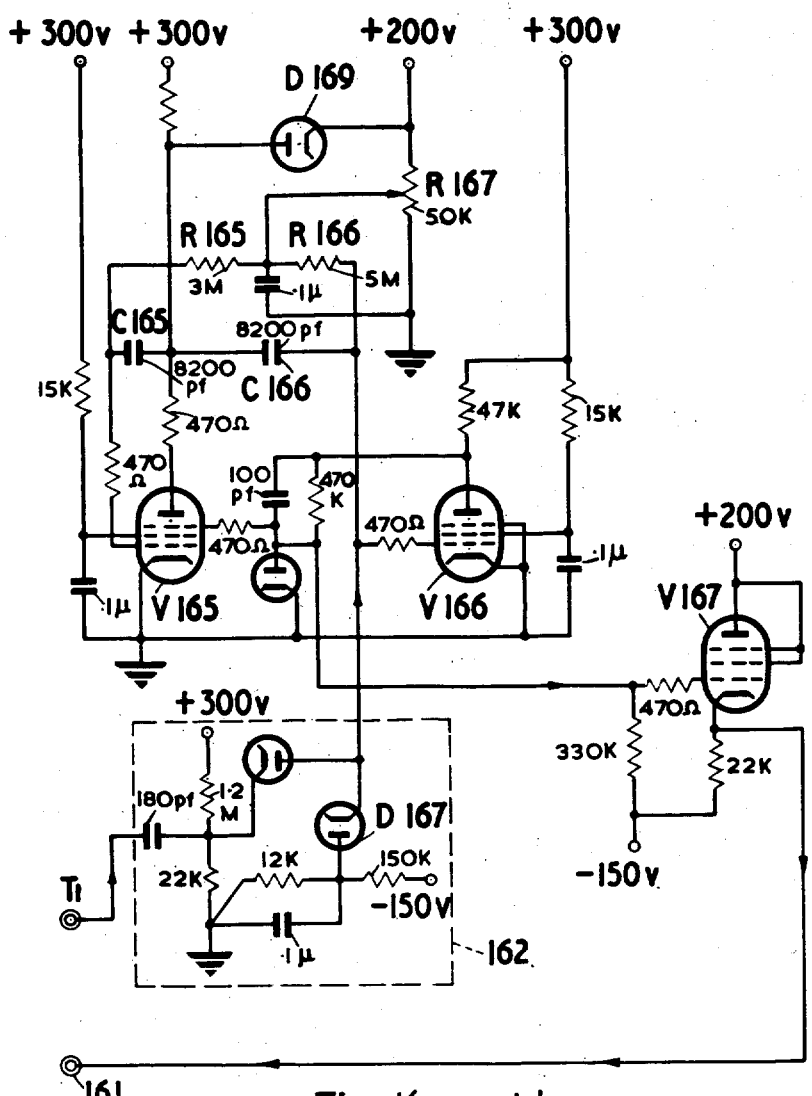
Figure 17:
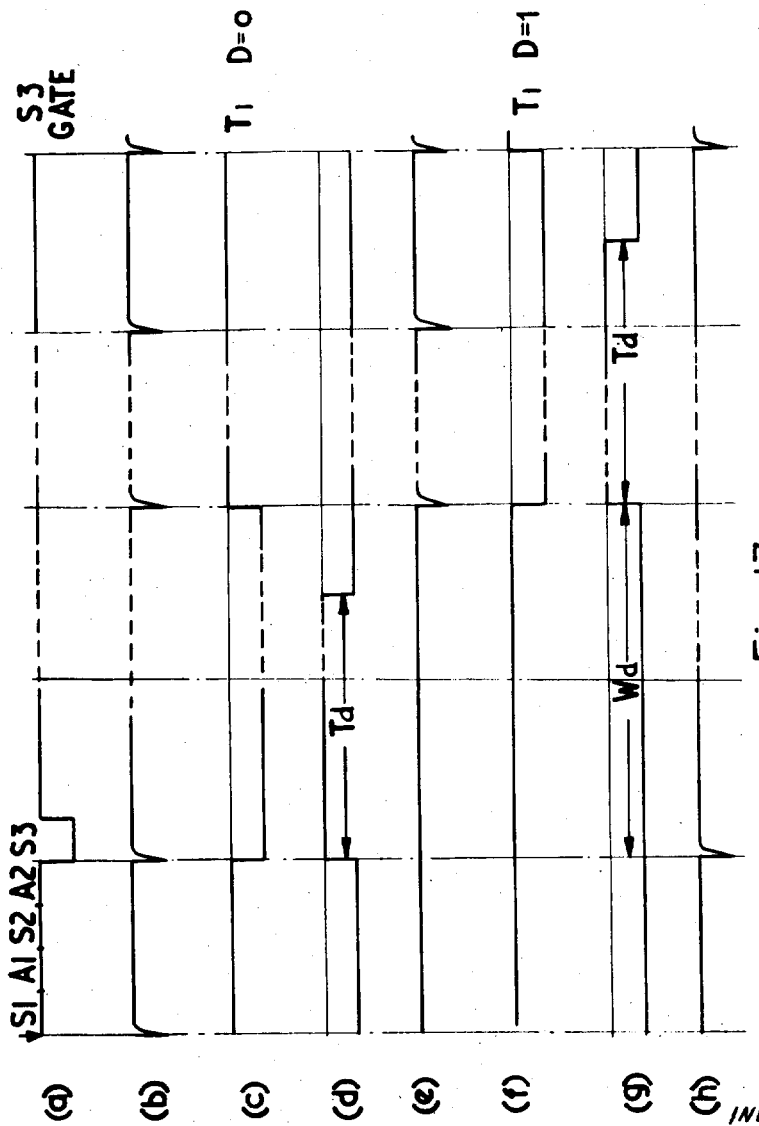

Circuit details of the T trigger represented in Figure 4 are shown in Figure 16 and explanatory voltage waveforms are shown in Figure 17. The part of the T trigger circuit, comprising the valves V161 and V162 and cathode follower valves V163 and V164, is similar to the corresponding part of the circuit of the W trigger. It is however employed in connection with a Sanatron type delay circuit which is designated to produce a more accurate delay time than can be produced by the Phantastron type delay circuit.

If the D digit is 0, due to an inward transfer being ordered, the delay W is not required to allow time for the write relay tree to be set up, and as already described, the W trigger is not triggered and the S3 gate voltage shown in Figure 17(a) is applied to the grid of valve V161 via the terminal 141. The T1 output voltage produced on the cathode of the cathode follower valve V163 therefore goes negative at the beginning of the S3 beat as shown in Figure 17(c). The negative going edge of the T1 voltage is applied to the grid of valve V166 through the circuit network 162 which differentiates the voltage waveform and confines the voltage applied to the grid within the voltage range +10 volts to —10 volts.

The Sanatron type delay comprises the valves V165 and V166 both of which are drawing grid current as their grids are connected through the 3 megohm resistance R165 and 5 megohm resistance R166 respectively, to the centre tap of the resistance R167 connected between +200 volts and earth potential. The valve V166 will therefore be fully conducting and the negative potential on the suppressor grid of the valve V165 due to the D. C. connection from the anode of valve V166 will minimise the current flowing through valve V165. The potential on the anode of valve V165 therefore is high and is fixed at +200 volts by the diode D169.

When the negative trigger pip from the network 162 is applied to the grid of valve V166 the valve is cut off and the anode potential rises. The potential on the suppressor grid of valve V165 rises to earth potential and the valve V165 immediately passes current. This causes a sudden drop in the potential at the anode which is applied to the grids of valves V165 and V166 through the 8200 micro-micro-farads condensers C165 and C166. The valve V166 is cut off and the grid is held at —10 volts by the diode D167. The anode potential on valve V165 now falls linearly with a time constant controlled by the 8200 micro-micro-farads condenser C165 and the 3 megohm resistance R165. The voltage on the suppressor grid of valve V165 is applied to the grid of the cathode follower valve V167 and the output of the cathode follower shown in Figure 17(d) is applied via terminal 161 and the diode D165 to suppress the retrigger pips shown in Figure 17(b) on the grid of valve V162 normally produced by the Co and differentiated $Ha$ voltages applied to the diodes D163 and D164, for the delay period $Td$ shown in Figure 17(d). When the potential on the anode of valve V165 reaches its lowest value the voltage on the grid rises and the voltage on the grid of valve V166 is brought rapidly to earth potential from —10 volts. Valve V166 immediately passes current and cuts valve V165 off at its suppressor grid so that the anode potential rises rapidly to +200 volts and the circuit assumes its rest condition. By adjusting the position of the tap on the variable resistance R167 this is arranged to take place mid-way between the 15th and 16th retrigger pulse so that the 16th retrigger pulse formed from the differentiated H$a$ voltage is allowed to be applied to the grid of valve V162 as shown in Figure 17(e) and the T trigger is reset.

If an outward transfer is ordered and the D digit is 1, then the initial trigger pulse applied to the grid of valve V161 via the terminal 141 is delayed by the time period W as shown in Figure 17(g) and is derived from the W trigger via terminal 141 in Figure 14. The subsequent action is then as already described for the case when the D digit is 0, the resulting T1 voltage waveform is shown in Figure 17(f), and the retrigger pips on the grid of valve V162 is shown in Figure 17(h).

Figure 29:
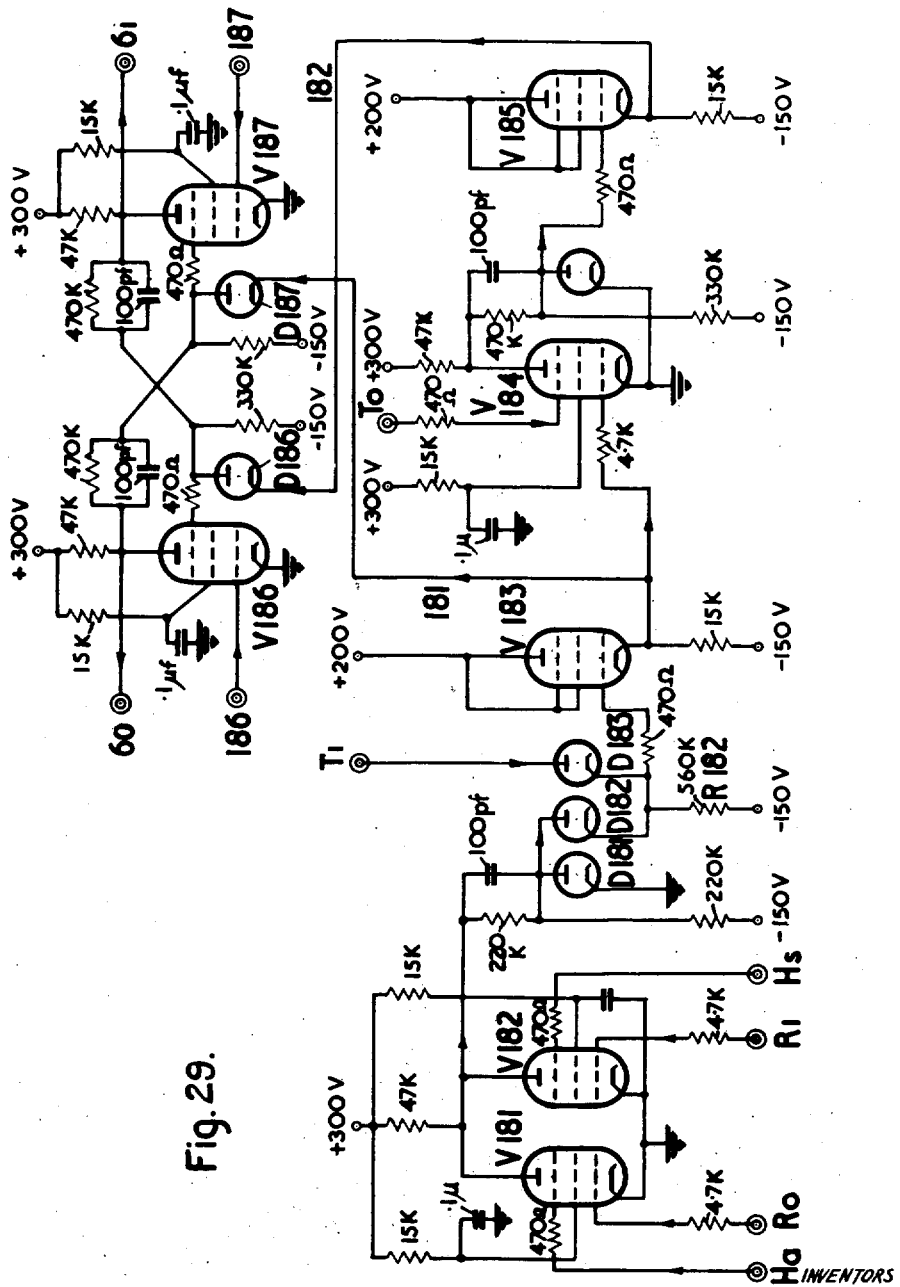

A detailed description of the selection control unit 30 and the staticisor 6 shown in Figure 7, which is designed to produce the voltage waveforms shown in Figure 8, will now be given with reference to Figure 29. The valves V181 and V182 have a common anode load and the two phases of the halver voltage H$a$ and H$s$ are applied to the suppressor grids. When the R digit is 1 the R magnetic function staticisor is triggered and the R0 output is positive and the R1 output is negative. Therefore, valve V181 is conducting and valve V182 is cut off and a voltage having the H$a$ waveform is produced at the common anode point. This voltage waveform is D. C. restored below earth potential by the D. C. coupling network and diode D181 and applied to an And gate constituted by diodes D182 and D183 and resistance R182. If a transfer is in progress then the T1 voltage is negative and the H$s$ voltage is applied to the grid of the cathode follower valve V183. The cathode signal of this valve forms one phase of the output on lead 181 shown in Figure 8(c). This signal is also applied to the grid of valve V184 and the opposite phase obtained at the anode is D. C. restored below earth and applied to the cathode follower valve V185 which furnishes the second output shown in Figure 8(d) on lead 182. During nontransfer the T1 voltage is positive and the T0 voltage negative so that the level of the outputs on the leads 181 and 182 are held at earth potential. If the state of the R digit is changed to 0 then valve V172 conducts instead of valve V181 and the H$a$ voltage is obtained at the anode of diode D182. The output on the lead 181 is then as shown in Figure 8(a) and the output along the lead 182 is as shown in Figure 8(b).

The lead 182 is connected to the cathode of the diode D186 and the lead 181 is connected to the cathode of diode D187 in the electrostatic staticisor 6, which consists of two valves V186 and V187 connected to form a trigger circuit. In the normal state when no transfer is occurring, the leads 181 and 182 are both at earth potential so that the staticisor is free to obey the trigger pulses applied to the grid of valve V186 from the electrostatic control unit from terminal 186 and the resetting pulses applied to the grid of valve V187 from terminal 187. During a magnetic transfer the opposite phases of the halver voltages as shown in Figures 8(a) and 8(b) when the R digit is 0 and as shown in Figures 8(c) and 8(d) when the R digit is 1 are applied to the suppressor grids of these valves through the diodes D186 and D187.

When the R is 0 the voltage applied to the suppressor grid of valve V187 is positive during action periods and negative during scan periods while the voltage applied to the suppressor grid of valve V186 is negative during action periods and positive during scan periods. Thus the voltage on the anode of valve V186 is constrained at a lower level during scan periods and at a high level during action periods so that the voltage waveform appearing at the output $6_0$ is as shown in Figure 8(a). The voltage on the anode of valve V187 will be the inverse of this so that the output $6_1$ will be as shown in Figure 8(b).

When the R digit is 1 the phase of the halver voltage applied to each suppressor grid is reversed and the output $6_0$ is as shown in Figure 8(c) and the output $6_1$ is as shown in Figure 8(d).

The staticisor 7 shown in Figure 7 is similar to the staticisor 6 just described. The diode corresponding to the diode D187 is connected to earth and the diode corresponding to the diode D186 will be connected to the 1 output of the appropriate magnetic store staticisor through an And gate controlled by the T1 voltage. Thus in the normal state when the T1 voltage is positive the output of the magnetic store staticisor will be blocked and the trigger will behave in the usual manner under the control of the trigger and retrigger pulses. During a magnetic transfer however, the T1 voltage is negative so that the state of the 1 output of the appropriate digit (digit 25) trigger in the magnetic store staticisor is impressed upon the electrostatic staticisor 7. Thus if the 25 staticisor is triggered then the staticisor 7 is triggered and if the 25 staticisor is not triggered then the staticisor 7 will be set in the untriggered state by the continuous retriggerer pulses applied to the grid of the valve corresponding to valve V187.

Figure 30:
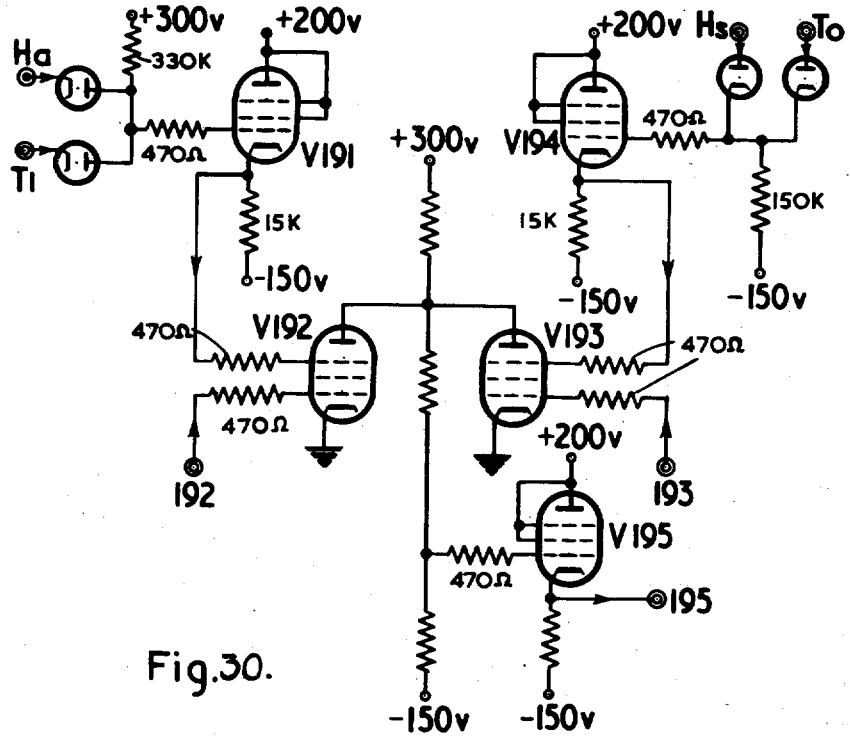

The circuit arrangements for generating the Y-scan voltage waveform, shown in Figure 9(b), which produces the special scanning sequence of the lines in the raster of a cathode ray tube in the electrostatic store, will now be described with reference to Figure 30 which shows a modified typical stage of the Y-scan generator fully described in the aforesaid paper by Williams and Kilburn.

In normal operation when no magnetic transfer is taking place the T1 voltage is positive so that the halver action voltage H$a$ is produced on the cathode of the cathode follower valve V191 as the grid of the valve will follow the most negative of the applied voltages. The T0 voltage is normally negative so the halver scan voltage H$s$ is produced on the cathodes of the cathode follower valve V194 as the grid of this valve will follow the most positive of the applied voltages. The outputs of the valves V191 and V194 are applied to the suppressor grids of valves V192 and V193 respectively so that the valve V192 passes current during action periods and the valve V193 passes current during scan periods. The grid of valve V192 is controlled via terminal 192 by the appropriate line staticisor so that the voltage level obtained at terminal 195 through the cathode follower valve 195 is applied during action periods to the mixing circuit which mixes the output from each of the five stages of the Y-scan generator to produce an output voltage level which selects one of the 32 lines in the raster. During scan periods the valve V193 passes current and the output voltage level at terminal 195 is controlled by the appropriate counterwaveform voltage applied to the grid of valve via terminal 193 so that the resultant of the five outputs produces part of the sequential scan. The resultant output is then as shown in Figure 9(a).

When a magnetic transfer is taking place the resultant output voltage level maintained during a scan period is required to be prolonged for the duration of the following action period. This means that the valve V193 is required to be operative continuously and the valve V192 is required to be continuously non-operative. During a magnetic transfer the T1 voltage will be continuously negative so that the cathode of valve V191 and the suppressor grid of valve V192 will be negative and the valve V192 will be non-operative. The T0 voltage is positive at this time and as the grid of valve V194 follows the most positive of the voltage levels applied to the diodes, the valve V194 will conduct and its cathode and the suppressor grid of valve V193 will be maintained at earth potential throughout the transfer period. The required conditions will therefore prevail.

Figure 10:
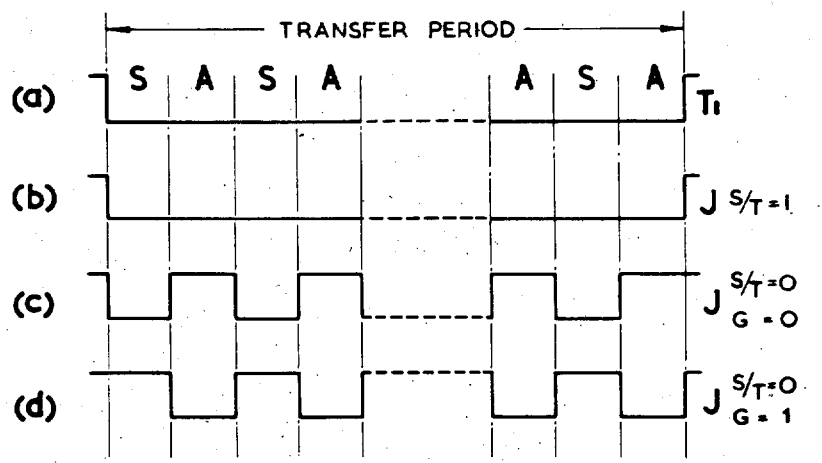
Figure 31:
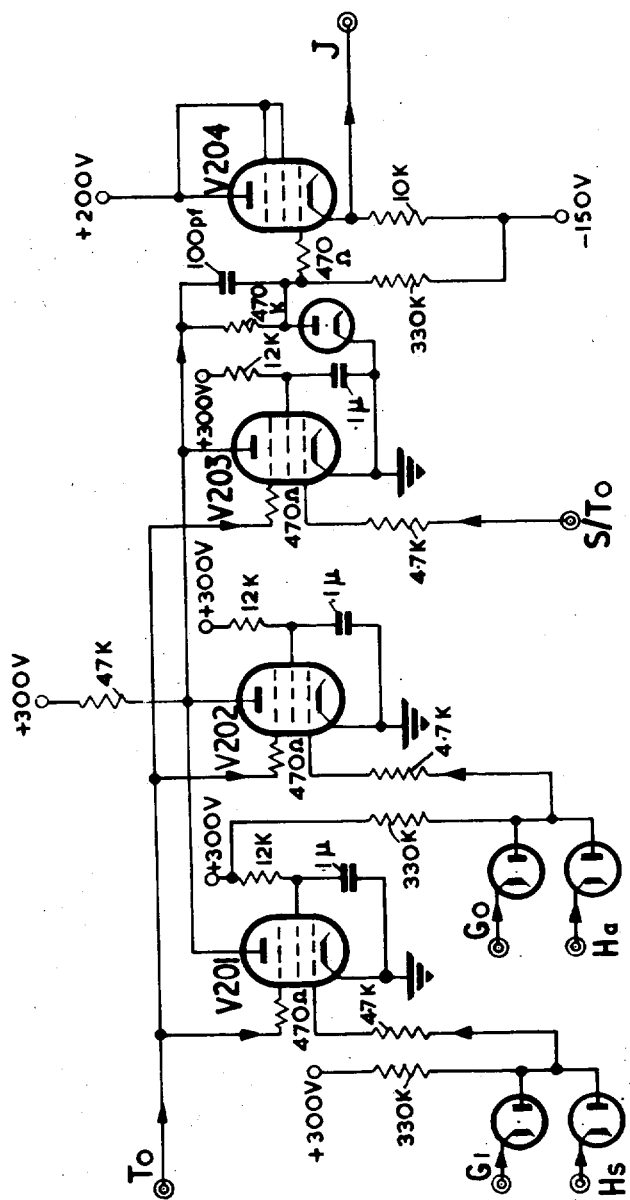

The J voltage generator which has already been shown in and described in connection with Figures 3 and 11 will now be described in greater detail with reference to Figure 31 which shows circuit details and Figure 10 which shows the waveforms of the various J voltages.

The J voltage generator consists essentially of three anode connected valves V201, V202 and V203 feeding into a cathode follower valve V204. The suppressor grids of the three valves are each connected to the T0 voltage so that when a magnetic transfer is not taking place, the three valves are cut off and the potential on their connected anodes rests at a high positive value. The grid of valve V4 is therefore held at earth potential by the D. C. connecting chain and the output voltage J corresponds with the rest level shown in Figures 10(b), 10(c) and 10(d) before the beginning and after the end of a transfer period.

When a magnetic transfer is taking place, the T0 voltage is positive and the common anode potential of the three valves V201, V202 and V203 will be controlled by the control grids of the valves. If the S/T digit is 1, then the S/T0 voltage will be positive and the valve V203 will be fully conducting for the complete transfer period. The potential on the connected anodes will therefore rest at a low positive valve and the waveform of the J voltage will be as shown in Figure 10(b).

If the S/T digit is 0, then the S/T0 voltage will be negative and the potential on the anodes of the three valves V201, V202 and V203 will be controlled by the connections to the control grids of valves V201 and V202. If the G digit is 0 then the G1 voltage will be positive and the halver scan voltage Hs will be applied to the grid of valve V201 as the grid will follow the most negative of the applied voltages. Similarly the grid of valve V202 will be held negative by the G0 voltage and the voltage at the common anode point of the three valves V201, V202 and V203 and therefore the output voltage J will follow the inverse of the halver scan voltage Hs and have the waveform shown in Figure 10(c). If the G digit is 1, the G1 voltage is negative and the valve V201 is cut off, while the G0 voltage is positive and the halver action voltage Ha is applied to the grid of valve V202. The voltage at the common anode point of the three valves V201, V202 and V203 and therefore the output voltage J follows the inverse of the halver action voltage Ha and have the waveform shown in Figure 10(d).

Figure 32:
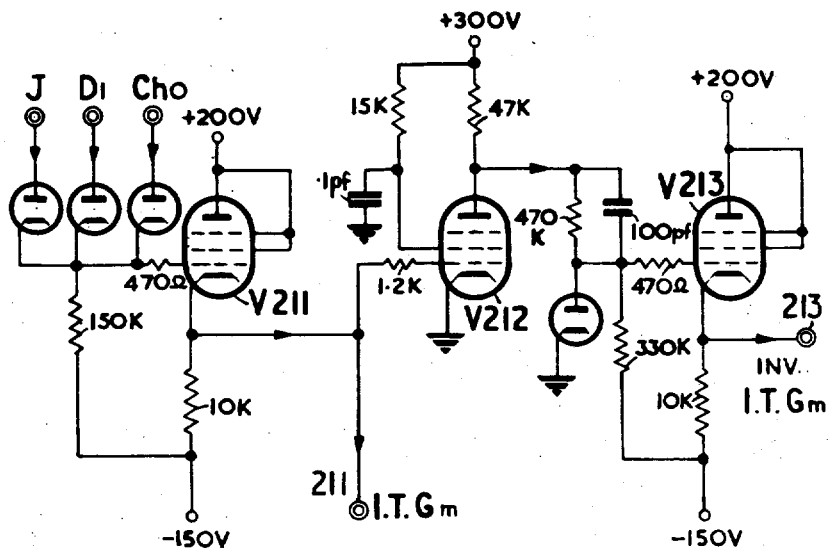

The inward transfer gate magnetic waveform generator shown as 39 in Figure 3 will now be described with reference to Figure 32. The grid of valve V211 is connected to a diode and gate and the voltage on the grid will therefore follow the most positive of the three applied voltages. Thus if the D digit is 1 for a transfer from the electrostatic to the magnetic storage system and the check digit Ch is 0 indicating that a check transfer is not taking place the grid of the cathode follower valve V211 can follow the J voltage. The inward transfer gate magnetic voltage I. T. Gm. taken via terminal 211 will therefore follow the J voltage when a transfer inwards to the magnetic store is ordered and a check transfer is not. If otherwise the output from terminal 211 will assume a positive level which closes the gate 32 shown in Figure 3 and prevents a transfer taking place.

The inverse inward transfer gate magnetic voltage is taken from terminal 213 for application to the write unit 34 shown in Figure 3 and is simply derived from the cathode of valve V211 by being passed through the inverting valve 212, the D. C. coupling circuit and the cathode follower valve 213.

Figure 33:
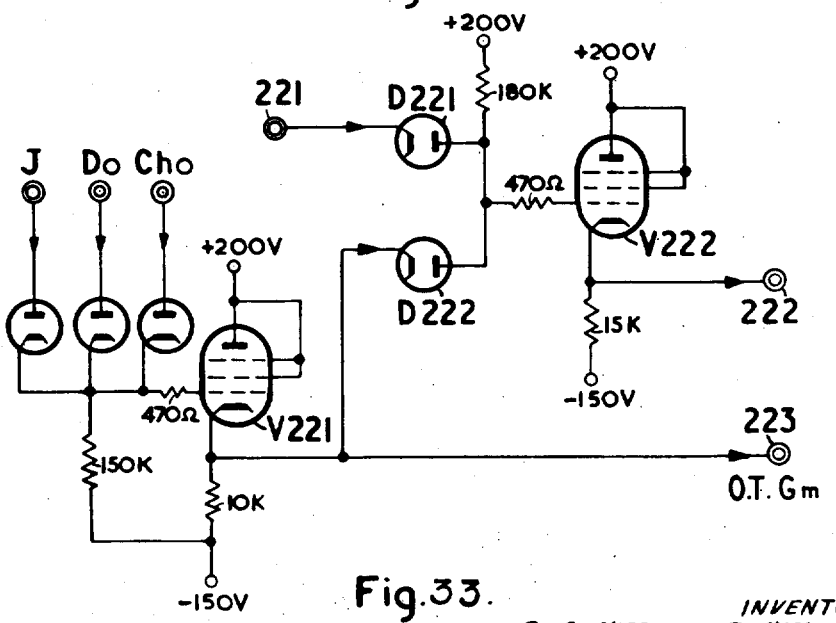

The outward transfer gate magnetic waveform generator shown as 118 in Figure 11 will now be described with reference to Figure 33. The grid of cathode follower valve V221 is connected through a diode and gate to the J voltage, the D0 voltage and the CH0 voltage. From the description given with reference to the previous figure it will be apparent that the outward transfer gate magnetic voltage O. T. Gm. taken via terminal 223 for application to the gate 117 in Figure 11 will follow the J voltage when a transfer from the magnetic store is ordered and a check transfer is not.

The O. T. Gm. voltage is applied to the cathode of the diode D222 which forms an Or gate with the diode D221 as the potential on the grid of valve V222 follows the most negative of the two applied voltages. The voltage applied at terminal 221 is the input 119 to the O. T. Gm. generator 118 shown in Figure 11. The voltage applied at terminal 221 is thus the normal erase voltage applied to the suppressor grid of the erase valve (valve V101, Fig. 19) in the regenerative loop of a Williams store as previously described. Consequently the voltage appearing at the output terminal 222 which is connected via lead 110 (in Figure 11) to the regenerative loop of all the Williams' tubes in the electrostatic store, will carry out a normal erasing operation and also suppress the regenerative loop when digital data is being read into the selected tube from the magnetic store.

The process by which one track is selected out of a large number of tracks on the magnetic recording drum has already been described in outline with reference to Figure 11. Each pre-amplifier block 112 comprises 16 pentode amplifying valves, one valve amplifying the output of each reading head 36 and it is therefore possible to select the output of one of these 16 valves for passing on to the post-amplifier 114 by cutting off the other 15 valves at their suppressor grids. It has been found impracticable to carry this out by connecting the suppressor grids directly to four resistances attached to the switching voltages produced by the track staticisors as a high impedance is established between the suppressor grid and earth which introduces both external pick-up and internal feedback signals into the valve.

Satisfactory selection of the required track is obtained by employing the decoder shown at 113 in Figure 11, especially as the valve employed in the pre-amplifiers may now be chosen for its amplifying characteristics and reliability without regard for its suppressor grid base. Each of the 16 valves in a pre-amplifier block 112 is switched by means of a decording circuit shown in Figure 34. Although each of the 16 valves in a pre-amplifier is switched by a separate decoding circuit, the 16 decoding circuits required for one pre-amplifier block 112 are common to all the other blocks so that a total of 256 pre-amplifier valves can be switched by 16 decoding circuits.

Figure 34:
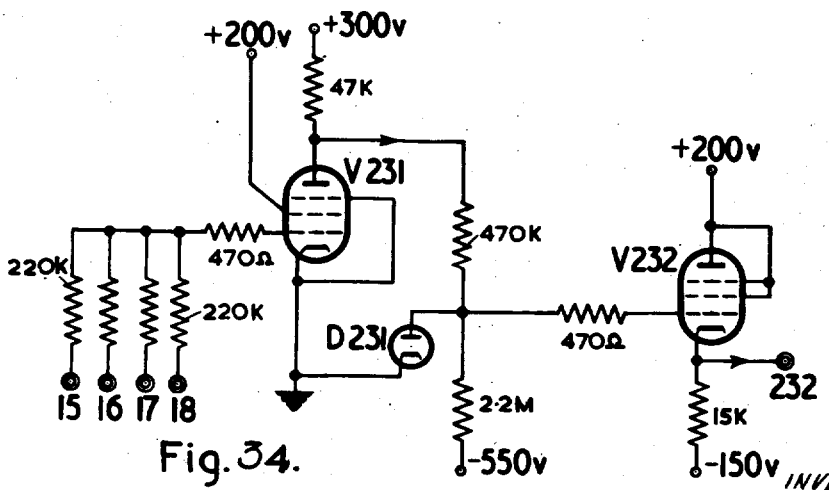

As shown in Figure 34 the four resistance leaks attached to the grid of the decoding valve V231 are connected to the outputs of the least significant track staticisors 15, 16, 17 and 18 in the magnetic staticisor. The voltage levels applied are either +70 volts or —10 volts so that all four applied voltages must be negative (one case in 16) before the grid of valve 231 is taken negative and the output on the anode of the valve is raised above earth potential. The values of the chain of resistances connected between +300 volts and —550 volts is such that when the valve V231 is cut off in this way the potential on the anode of the diode D231 is fixed at about +2 volts because the diode is connected to earth, but when the valve V231 is conducting and the voltage on its anode is about earth potential, the potential on the anode of the diode D231 falls to about —150 volts. Thus an output voltage of about +2 volts or —150 volts is passed through the cathode follower valve V232 to the terminal 232 which is connected to the suppressor grid of a pre-amplifier valve.

The decoder 115 shown in Figure 11 operates in a similar manner. In this case however only four decoding circuits are required, each being fed with two resistance leaks from the track staticisors 19 and 20.

What we claim is:

1. In an electronic digital computing machine a main data storage device of a type providing a plurality of separate storage locations each capable of storing one number or instruction signal, address selecting means associated with said main data storage device for obtaining immediate access to any chosen storage location therein, timing means determining the operating rhythm of the machine as comprising a plurality of sequential beat intervals each sufficient to effect expression in dynamic form of a number or instruction signal, a subsidiary data storage device having a plurality of separate storage locations each capable of holding one number or instruction signal, said subsidiary data storage device being of a type operable at the same signalling speed as said main data storage device but having a lower speed of access to the storage locations therein, synchronising means connected to said timing means and said subsidiary storage device for synchronising the signalling speed of said subsidiary storage device with that of said main storage device, a direct signal transfer channel including signal transmission control means between the said subsidiary data storage device and said main data storage device and a control system connected to said main data storage device and controlling said signal transmission control means to effect the transference of number and instruction signals therein under the control of an instruction signal selected from said main data storage device.

2. In an electronic digital computing machine a main data storage device of a type providing a plurality of separate storage locations each capable of storing one number or instruction signal, address selecting means associated with said storage device for obtaining immediate access to any chosen storage location therein, a control system governing the operation of the machine and the transference of number and instruction signals therein under the control of an instruction signal selected from said main data storage device, timing means determining the operating rhythm of the machine as comprising a plurality of sequential beat intervals each sufficient to effect expression in dynamic form of a number or instruction signal, a subsidiary data storage device having a plurality of separate storage locations each capable of holding one number or instruction signal, said subsidiary data storage device being of a type operable at the same signalling speed as said main storage device but presenting access to its different storage locations sequentially in predetermined order, synchronising means connected to said timing means and said subsidiary data storage device for adjusting the signalling speed and timing of said subsidiary data storage device to synchronise with that of said main data storage device, a direct signal transfer channel including signal transmission control means between the said subsidiary storage device and said main storage device, and signal transfer control means controlling said address selecting means and said signal transmission control means to effect the transfer of signals through said signal transfer channel between said subsidiary data storage device and selected storage locations in said main data storage device.

3. In an electronic digital computing machine a main data storage device of a type providing a plurality of separate storage locations each capable of storing one number or instruction signal, address selecting means associated with said storage device for obtaining immediate access to any chosen storage location therein, number signal utilising means, circuit means including switching means interconnecting said number signal utilising means and said main data storage device, a control system controlling said address selecting means and said switching means for governing the operation of the machine and the transference of number and instruction signals therein under the control of an instruction signal selected from said main data storage device, timing means determining the operating rhythm of the machine as comprising a plurality of sequential beat intervals each sufficient to effect expression in dynamic form of a number or instruction word signal, a subsidiary rotating magnetic drum type data storage device having a plurality of separate recording tracks each providing a plurality of separate storage locations for a number or instruction signal, synchronising means operated by said timing means and said magnetic drum storage device for adjusting the rotation speed and instantaneous angular position of said drum to synchronise the periods of accessibility of said drum storage locations with said beat intervals of said machine rhythm and a direct signal transfer channel between the said subsidiary magnetic drum storage device and said main storage device.

4. In an electronic digital computing machine a main data storage device of the cathode ray tube type providing a plurality of separate storage locations each capable of storing one number or instruction signal, address selecting means associated with said storage device for obtaining immediate access to any chosen storage location therein under the control of an address selecting signal, number signal utilising means, circuit means including signal controlled switching means interconnecting said number signal utilising means and said main data storage device, a control system including control signal generating means providing address selecting signals to control said address selecting means and switch controlling signals to said signal controlled switching means for governing the operation of the machine and the transference of number and instruction signals therein under the control of an instruction selected from said main data storage device, timing means determining the operating rhythm of the machine as comprising a plurality of sequential beat intervals each sufficient to effect expression in dynamic form of a number or instruction signal and each consisting of a predetermined number of sequential digit periods, a subsidiary rotating magnetic drum type data storage device having a plurality of separate recording tracks each providing a plurality of separate storage locations for number or instruction signals, synchronising means controlled by said timing means and said magnetic drum storage device for adjusting the instantaneous speed and position of said magnetic drum to synchronise the periods of accessibility of said drum storage locations with said digit intervals and said beat intervals of said machine rhythm, a direct signal transfer channel between the said subsidiary magnetic drum storage device and said main cathode ray tube storage device, and signal transfer control means including further control signal generating means for providing address selecting signals to said address selecting means of said cathode ray tube storage device to relate the signal storage location of such device which is rendered accessible at any time to the concurrently available storage location on said drum.

5. In an electronic digital computing machine operating with data items represented by serial form electric pulse signal trains and comprising a main data storage system including at least one storage device having a predetermined number of separate storage locations for either number or instruction data item-representing signals and a control system governing the operation of the machine and the transference of number and instruction signals therein in accordance with an instruction-representing signal supplied thereto, the provision of a subsidiary data storage system having a plurality of separate signal-group storage locations for groups of data item-representing signals, the number of signals in each group being the same as said predetermined number of separate individual storage locations in said main data storage device, a direct transfer channel between said subsidiary data storage system and said main data storage system, said transfer channel including switch means for opening and closing said channel to the passage of signals therethrough and signal transfer control means operating said switch means, said signal transfer control means being operated by said control system for effecting a continuous transference of one of said groups of data item-representing signals as a series of electric pulse signal trains between said subsidiary data storage system and said storage device of said main data storage system under the control of an instruction signal fed to said control system.

6. In an electronic digital computing machine operating in the serial mode with data expressed as electric pulse signal trains and comprising a main data storage system including at least one storage device having a predetermined number of separate and immediately accessible storage locations for individual data item-representing signals and a control system governing the operation of the machine and the transference of number and instruction representing signals therein, the provision of a subsidiary data storage system having a plurality of immediately accessible separate signal-group storage locations for groups of data item-representing signals, each group comprising the same predetermined number of data signals as there are separate individual storage locations in said main data storage device, group storage selecting means for selecting a chosen one of said group storage locations, signal deriving means for generating an electric signal in the form of a series of sequential electric pulse signal trains representative of the contents of said chosen storage group, a direct signal transfer channel between said signal deriving means and said main data storage device and signal transfer control means controlling said group storage selecting means, said signal transfer control means being operated by said control system for effecting transference of the entire contents of said chosen group storage location between said subsidiary data storage system and said storage device of said main data storage system under the control of a single instruction signal fed to said control system.

7. In an electronic digital computing machine comprising a main data storage system including at least one storage device having a predetermined number of separate and immediately accessible storage locations for individual data item signals and a control system governing the operation of the machine and the transference of number and instruction signals therein, the provision of a subsidiary data storage system, said subsidiary data storage system comprising a rotatable magnetic recording drum having a plurality of parallel recording tracks therearound with each track containing a group of separate individual storage locations and each group containing the same predetermined number of individual signal storage locations as in a storage device of said main data storage system, separate record reading means for each of said tracks, for providing a group of separate electric signals representative of the contents of said track, track selecting means for selecting a chosen one of said track record reading means, a direct signal transfer channel between said track selecting means and said main storage device, signal transmission control means in said transfer channel and signal transfer control means controlling said track selecting means, said record reading means and said signal transmission control means, said signal transfer control means being operated by said control system to effect a continuous sequential transference of one of said groups of signals between a selected track of said magnetic drum and said main storage device under the control of a single instruction signal fed to said control system.

8. An electronic digital computing machine comprising a main data storage system having a plurality of separate and immediately accessible storage locations for a plurality of number and instruction data representing signals, a computing organ for performing an arithmetical operation between number-representing signals applied thereto, first circuit means including signal-controlled gate circuit means interconnecting said main data storage system and said computing organ, a subsidiary storage system also having a plurality of separate storage locations for number or instruction representing signals, second circuit means including signal controlled switch means interconnecting said main data storage system and said subsidiary storage system, a first control system connected to said main data storage system and controlling said signal controlled gate circuit means to effect transfers of data signals within said machine including transfers between said main storage system and said computing organ in response to first instruction signals applied sequentially thereto from said main data storage system and a second control system connected to said main data storage system and controlled by said first control system and controlling said signal controlled switch means to effect direct transfer of data signals between said main data storage system and said subsidiary store under the control of a second instruction signal applied thereto from said main data storage system under the control of a first instruction signal in said first control system.

9. An electronic digital computing machine comprising a main data storage system including at least one storage device having a predetermined number of separate and immediately accessible storage locations for individual number and instruction data signals, a subsidiary storage system connected to said main data storage system through first switch means and having a plurality of separate groups of storage locations for individual number and instruction signals, the number of storage locations in each group being equal to said predetermined number of storage locations in said main data storage device, a first control system connected to said main data storage system, a second control system connected to said main data storage system through second switch means, said first control system controlling said second switch means in response to a first instruction signal applied thereto from said main data storage device and said second control system controlling said first switch means in response to a second instruction signal applied thereto from said main data storage device under the control of a first instruction signal in said first control system to effect the direct transfer of a complete group of data signals between said main storage device and a chosen group storage location of said subsidiary storage system.

10. An electronic digital computing machine including a main data storage system which comprises a cathode ray storage tube having a predetermined number of separate and immediately accessible storage locations for individual data representing signals, a subsidiary storage system in the form of a rotatable magnetic recording drum having a plurality of circumferential recording tracks each having an integral number of groups of separate storage locations for data-representing signals, the number of storage locations in each group being equal to said predetermined number of storage locations in said tube, track selecting means for rendering a chosen one of said tracks accessible for signalling purposes, circuit means including first switch means connecting said track selecting means with said cathode ray storage tube, a first control system connected to said main data storage system, a second control system connected to said main data storage system through second switch means, said first control system controlling said second switch means to transfer a transfer instruction signal held in said main data storage system to said second control system in response to a first instruction signal applied to said first control system from said main data storage system and said second control system controlling said track selecting means and said first switch means to effect the transfer of at least one complete group of data signals directly between said main storage system and a chosen track of said subsidiary store under the control of said transfer instruction signal transferred to said second control system from said main data storage system under the control of said first instruction signal in said first control system.

11. An electronic digital computing machine having a main storage system comprising a plurality of pairs of cathode ray storage tubes each having a predetermined number of separate and immediately accessible storage locations for data representing signals required in the operation of the machine, a subsidiary store in the form of a rotatable magnetic recording drum, having a plurality of circumferential recording tracks each having twice said predetermined number of separate data signal storage locations therein, a direct signal transfer channel between said main storage system and said subsidiary store and a control system including signal transfer control means controlling said signal transfer channel for transferring the contents of one of said recording tracks into a chosen pair of said cathode ray storage tubes.

12. An electronic digital computing machine having a main storage system comprising a plurality of pairs of cathode ray storage tube stores each tube providing a predetermined number of separate and immediately accessible storage locations for data representing signals required in the operation of the machine, rhythm control means for operating said storage tubes with an alternate scan beat/action beat sequence, a subsidiary storage device in the form of a rotatable magnetic drum having a plurality of circumferential recording tracks, each track comprising twice said predetermined number of separate signal storage locations, record reading means for deriving an electric pulse signal train representing the contents of each track, a direct signal transfer channel between said main data storage system and said subsidiary storage device, first selecting means for connecting a chosen one of said record reading means to said direct signal transfer channel, second selecting means for connecting a chosen one of said pairs of storage tubes to said direct signal transfer channel and signal transfer control means controlling said first and second selecting means to effect the transfer of the signal contents of alternate storage locations of said selected track to one of said storage tubes during scan beats and to effect the transfer of the contents of the intremediate storage locations of said selected track to the other of said storage tubes during action beats.

13. An electronic digital computing machine operating with data represented by serial form electric pulse signal trains and including a main data storage system comprising a plurality of storage units each having a predetermined number of separate and immediately accessible storage locations for individual data-representing pulse train signals, an arithmetical organ for effecting a computing operation with data-representing signals derived from said main data storage system, first and second control systems, first circuit means including first switching means interconnecting said main data storage system with said arithmetical organ and said first and second control systems, said first control system controlling said first switching means to effect transfers of data signals between said main storage system and said arithmetical organ and said first and second control systems under the control of a first type of instruction signal derived from said main storage system, a subsidiary storage system having a plurality of separate and immediately accessible storage locations for groups of individual data signals, the number of data signals of each group being equal to said predetermined number of storage locations in any one of said storage units, second circuit means including second switching means interconnecting said subsidiary storage system with said main data storage system, said second control system controlling said second switching means to effect the direct transfer of said groups of data signals between said subsidiary storage system and said storage units of said main storage system under the control of a second type of instruction signal derived from said main storage system by said first control system under the control of a first type of instruction signal.

14. The invention as claimed in claim 13 in which said first control system includes a plurality of staticisor sections each controlled by the signal content of different specific digit positions of said first type instruction signal and controlling the operation of said first switching means and in which said staticisor sections control said first switching means to initiate the transfer of a second type instruction to said second control system only when said specific digit signals of said first type instruction signal are all of "0" significance.

15. The invention as claimed in claim 13 in which said first control system includes individual digit signal operated means for operation by said first type instruction signals responsive one to each of a predetermined number of digit positions in said instruction signal and in which said second control system includes individual digit signal operated means for operation by said second type of instruction signal having a number of digit positions greater than said predetermined number of said first type instruction signal.

16. The invention as claimed in claim 13 wherein each of said storage units of said main data storage system comprises a group of two cathode ray storage tubes and which includes signal selecting means connected between said second circuit means and said main data storage system, said signal selecting means being also controlled by said second control system for selectively transferring data signals between a single one of said tubes and a half of one of said groups of storage locations of said subsidiary storage system under the control of said second type instruction signal.

17. The invention as claimed in claim 13 wherein each of said storage units of said main data storage system comprises two cathode ray storage tubes each having half said predetermined number of separate data signal storage lines and which includes line scan selecting means for said two storage tubes, said line scan means operating to transfer the contents of a first storage line of one tube and then transfer of the contents of a first storage line of the other tube and then the second storage line of said one tube and so on alternately.

18. The invention as claimed in claim 13 which includes selector-reversing means for reversing the tube scanning order of said line scan selecting means to transpose the alternate transfer of line contents from said two tubes and control means operated by said second control system for controlling said selector reversing means in accordance with the significance of the signal content of a chosen digit position in said second type instruction signal.

19. An electronic digital computing machine as claimed in claim 13 which includes group selecting means controlled by said second control system for selecting a chosen one of said plurality of group storage locations in said subsidiary storage system and connecting it to said second circuit means feeding data-item representing signals from said main storage system to said subsidiary storage system, transfer start control means controlled by said second control system for initiating the transfer of the contents of a storage unit of said main storage system to said selected group storage location in said subsidiary storage system and signal delaying means for delaying the stimulation of said transfer start control means for a predetermined time interval after energisation of said group selecting means.

20. An electronic digital computing machine as claimed in claim 13 which includes timing means for operating said second switching means to terminate a transfer after a time interval equal to that necessary to effect transference of the contents of one of said storage units.

21. In an electronic digital computing machine comprising a main data storage system including at least one storage device having a predetermined number of separate storage locations for either number or instruction data item-representing signals and a control system governing the operation of the machine and the transference of number and instruction signals therein in accordance with an instruction-representing signal supplied thereto, the provision of a subsidiary data storage system having a plurality of separate signal-group storage locations for groups of data item-representing signals, the number of data signals in each group being the same as said predetermined number of separate individual storage locations in said main storage device, a first direct transfer path from said main data storage system to said subsidiary data storage system, a second direct transfer path from said subsidiary data storage system to said main data storage system, switch means in each of said first and second transfer paths and signal transfer control means controlling said switch means, said signal transfer control means being operated by said control system for effecting a continuous transference of one of said groups of data item-representing signals in a chosen direction between said subsidiary data storage system and said storage device of said main data storage system under the control of instruction signals fed to said control system.

22. In an electronic digital computing machine comprising a main data storage system including at least one storage device having a predetermined number of separate and immediately accessible storage locations for individual data item-representing signals and a control system governing the operation of the machine and the transference of number- and instruction-representing signals therein, the provision of a subsidiary data storage system having a plurality of immediately accessible separate signal-group storage locations for groups of data item-representing signals, each group comprising the same predetermined number of data signals as there are separate individual storage locations in said main data storage device, group storage selecting means for selecting a chosen one of said group storage locations, signal recording means for recording electric signals in said chosen group storage location of said subsidiary data storage system, signal deriving means for generating an electric signal representative of the contents of said chosen storage group, a first direct signal transfer channel from said main data storage device to said signal recording means, a second direct signal transfer channel from said signal deriving means to said main data storage device, switch means in each of said first and second transfer channels and signal transfer control means controlling said group storage selecting means and said switch means, said signal transfer control means being operated by said control system for effecting continuous transference of a group of said predetermined number of data signals in a chosen direction between a chosen group storage location in said subsidiary data storage system and said storage device of said main data storage system under the control of a single instruction signal fed to said control system.

23. An electronic digital computing machine having a main storage system comprising a plurality of pairs of cathode ray storage tubes each having a predetermined number of separate and immediately accessible storage locations for data representing signals required in the operation of the machine, a subsidiary store in the form of a rotatable magnetic recording drum, having a plurality of circumferential recording tracts each having twice said predetermined number of separate data signal storage locations therein, a direct signal transfer channel between said main storage system and said subsidiary store, tube pair selecting means for connecting a chosen pair of said plurality of pairs of cathode ray storage tubes to said direct signal transfer channel, track selecting means for rendering a chosen one of said recording tracks accessible to said direct transfer channel and signal transfer control means controlling said tube-pair selecting means and said track selecting means for transferring the contents of one of said recording tracks into a chosen pair of said cathode ray storage tubes.

References Cited in the file of this patent

UNITED STATES PATENTS

| 2,540,654 | Cohen et al. | Feb. 6, 1951 |
| 2,604,262 | Phelps et al. | July 22, 1952 |

OTHER REFERENCES

"Second Interim Progress Report on the Physical Realization of an Electronic Computing Instrument," Bigelow et al., Institute for Advanced Study, July 1, 1947.

A Digital Computer for Scientific Applications, West et al., Proc. I. R. E., December 1948, pp. 1452–1459.

A Functional Description of the Edvac, volumes I and II, University of Pennsylvania, November 1, 1949.